US012019714B2

(12) United States Patent
Bertinetto et al.

(10) Patent No.: US 12,019,714 B2
(45) Date of Patent: Jun. 25, 2024

(54) STRUCTURE DETECTION MODELS

(71) Applicant: Five AI Limited, Bristol (GB)

(72) Inventors: Luca Bertinetto, Oxford (GB); Romain Mueller, Cambridge (GB); Konstantinos Tertikas, Oxford (GB); Sina Samangooei, Cambridge (GB); Nicholas A Lord, Oxford (GB)

(73) Assignee: Five AI Limited, Cambridge (GB)

( * ) Notice: Subject to any disclaimer, the term of this patent is extended or adjusted under 35 U.S.C. 154(b) by 816 days.

(21) Appl. No.: 17/098,032

(22) Filed: Nov. 13, 2020

(65) Prior Publication Data
US 2021/0150346 A1 May 20, 2021

(30) Foreign Application Priority Data
Nov. 15, 2019 (GB) ...................... 1916689

(51) Int. Cl.
G06F 18/243 (2023.01)
G06F 17/18 (2006.01)
G06F 18/2411 (2023.01)
G06N 3/08 (2023.01)
G06N 20/00 (2019.01)
G06V 10/764 (2022.01)
G06V 10/82 (2022.01)

(52) U.S. Cl.
CPC ........ *G06F 18/24323* (2023.01); *G06F 17/18* (2013.01); *G06F 18/2411* (2023.01); *G06N 3/08* (2013.01); *G06N 20/00* (2019.01); *G06V 10/764* (2022.01); *G06V 10/82* (2022.01)

(58) Field of Classification Search
None
See application file for complete search history.

(56) References Cited

PUBLICATIONS

Aguilar, Eduardo, Marc Bolaños, and Petia Radeva. "Regularized uncertainty-based multi-task learning model for food analysis." Journal of Visual Communication and Image Representation 60 (2019): 360-370. (Year: 2019).*
Bayraktar, Ertuğrul, Cihat Bora Yigit, and Pinar Boyraz. "Tailoring the AI for Robotics: Fine-tuning Predefined Deep Convolutional Neural Network Model for a Narrower Class of Objects." In Proc. of the 2017 International Conference on Mechatronics Systems and Control Engineering, pp. 10-14. 2017. (Year: 2017).*
Ahmed et al., Network of experts for large-scale image categorization. ArXiv preprint arXiv:1604.06119v3. Apr. 19, 2017;3:1-30.
(Continued)

*Primary Examiner* — Vincent Gonzales
(74) *Attorney, Agent, or Firm* — Andrew J. Tibbetts; Samuel S. Stone; Greenberg Traurig, LLP

(57) ABSTRACT

A perception model is trained to classify inputs in relation to a discrete set of leaf node classes. A hierarchical classification tree encodes hierarchical relationships between the leaf node classes. A training loss function is dependent on a classification score for a given training input a its ground truth leaf node class of the training input, but also classification scores for at least some others of the leaf node classes, with the classification scores of the other leaf node classes weighted in dependence on their hierarchical relationship to the ground truth leaf node class within the hierarchical classification tree.

20 Claims, 14 Drawing Sheets

(56) References Cited

PUBLICATIONS

Akata et al., Evaluation of output embeddings for fine-grained image classification. Proceedings of the IEEE conference on computer vision and pattern recognition. 2015:2927-2936.
Barz et al., Deep learning is not a matter of depth but of good training. International Conference on Pattern Recognition and Artificial Intelligence (ICPRAI). May 2018:683-687.
Barz et al., Hierarchy-based image embeddings for semantic image retrieval. ArXiv preprint arXiv:1809.09924v4. Mar. 19, 2019:1-17.
Bilal et al., Do convolutional neural networks learn class hierarchy?. IEEE transactions on visualization and computer graphics. Aug. 29, 2017;24(1):152-62.
Bojanowski et al., Enriching word vectors with subword information. Transactions of the Association for Computational Linguistics. Jun. 2017;5:135-46.
Brust et al., Integrating domain knowledge: using hierarchies to improve deep classifiers. ArXiv preprint arXiv:1811.07125v2. Jan. 23, 2020;2:1-14.
Chorowski et al., Towards better decoding and language model integration in sequence to sequence models. ArXiv preprint arXiv:1612.02695v1. Dec. 8, 2016:1-6.
Cui et al., Class-balanced loss based on effective number of samples. Proceedings of the IEEE/CVF Conference on Computer Vision and Pattern Recognition. 2019:9268-9277.
Deng et al., Hierarchical semantic indexing for large scale image retrieval. 2011 CVPR. Jun. 20, 2011:785-792.
Deng et al., Imagenet: A large-scale hierarchical image database. 2009 IEEE conference on computer vision and pattern recognition. Jun. 20, 2009:248-255.
Deng et al., What does classifying more than 10,000 image categories tell us?. European conference on computer vision. Sep. 5, 2010:71-84.
Deselaers et al., Visual and semantic similarity in imagenet. 2011 CVPR. Jun. 20, 2011:1777-1784.
Frome et al., Devise: A deep visual-semantic embedding model. Advances in Neural Information Processing Systems. 2013:1-11.
Goodman, Classes for fast maximum entropy training. ArXiv preprint arXiv:cs.CL/0108006. Aug. 9, 2001:1-4.
Han et al., Deep pyramidal residual networks. Proceedings of the IEEE conference on computer vision and pattern recognition. 2017:5927-5935.
He et al., Deep residual learning for image recognition. Proceedings of the IEEE conference on computer vision and pattern recognition. 2016:770-778.
Hinton et al., Distilling the knowledge in a neural network. ArXiv preprint arXiv:1503.02531v1. Mar. 9, 2015;1:1-9.
Jacobs et al., Adaptive mixtures of local experts. Neural computation. Mar. 1991;3(1):79-87.
Krizhevsky et al., Imagenet classification with deep convolutional neural networks. Advances in neural information processing systems. 2012;25:1097-105.
Lin et al., Focal loss for dense object detection. Proceedings of the IEEE international conference on computer vision. 2017:2980-2988.
Lin et al., Microsoft coco: Common objects in context. European conference on computer vision. Sep. 6, 2014:740-755.
Loshchilov et al., Sgdr: Stochastic gradient descent with warm restarts. ArXiv preprint arXiv:1608.03983v5. May 3, 2017:1-16.
Mikolov et al., Distributed representations of words and phrases and their compositionality. ArXiv preprint arXiv:1310.4546v1. Oct. 16, 2013:1-9.
Mikolov et al., Efficient estimation of word representations in vector space. ArXiv preprint arXiv:1301.3781v3. Sep. 7, 2013;3:1-12.
Morin et al., Hierarchical probabilistic neural network language model. Aistats Jan. 6, 2005;5:246-252.
Müller et al., When does label smoothing help?. ArXiv preprint arXiv:1906.02629v3. Jun. 10, 2020;3:1-13.
Paszke et al., Pytorch: An imperative style, high-performance deep learning library. ArXiv preprint arXiv:1912.01703v1. Dec. 3, 2019;1:1-12.
Pennington et al., Glove: Global vectors for word representation. Proceedings of the 2014 conference on empirical methods in natural language processing (EMNLP). Oct. 2014:1532-1543.
Peterson et al., Human uncertainty makes classification more robust. Proceedings of the IEEE/CVF International Conference on Computer Vision. 2019:9617-9626.
Reddi et al., On the convergence of adam and beyond. ArXiv preprint arXiv:1904.09237v1. Apr. 19, 2019;1:1-23.
Redmon et al., YOLO9000: better, faster, stronger. ArXiv preprint arXiv:1612.08242v1. Dec. 25, 2016;1:1-9.
Ren et al., Meta-learning for semi-supervised few-shot classification. ArXiv preprint arXiv:1803.00676v1. Mar. 2, 2018;1:1-15.
Romera-Paredes et al., An embarrassingly simple approach to zero-shot learning. International conference on machine learning. Jun. 1, 2015:2152-2161.
Ruggiero et al., A higher level classification of all living organisms. PloS one. Apr. 29, 2015;10(4):e0119248.
Russakovsky et al., Imagenet large scale visual recognition challenge. ArXiv preprint arXiv:1409.0575v2. Dec. 1, 2014;2:1-38.
Silla et al., A survey of hierarchical classification across different application domains. Data Mining and Knowledge Discovery. Jan. 2011;22(1):31-72.
Szegedy et al., Rethinking the inception architecture for computer vision. ArXiv preprint arXiv:1512.00567v3. Dec. 11, 2015;3:1-10.
Tsipras et al., Robustness may be at odds with accuracy. ArXiv preprint arXiv:1805.12152v5. Sep. 9, 2019;5:1-24.
Van Horn et al., The inaturalist species classification and detection dataset. ArXiv preprint arXiv:1707.06642v2. Apr. 10, 2018;2:1-10.
Vaswani et al., Attention is all you need. ArXiv preprint arXiv:1706.03762v5. Dec. 6, 2017;5:1-15.
Verma et al., Learning hierarchical similarity metrics. 2012 IEEE conference on computer vision and pattern recognition. Jun. 16, 2012:2280-2287.
Wu et al., Learning to make better mistakes: Semantics-aware visual food recognition. Proceedings of the 24th ACM international conference on Multimedia. Oct. 1, 2016:172-176.
Xian et al., Latent embeddings for zero-shot classification. Proceedings of the IEEE conference on computer vision and pattern recognition. 2016:69-77.
Xiao et al., Error-driven incremental learning in deep convolutional neural network for large-scale image classification. Proceedings of the 22nd ACM international conference on Multimedia. Nov. 3, 2014:177-186.
Yan et al., HD-CNN: hierarchical deep convolutional neural networks for large scale visual recognition. Proceedings of the IEEE international conference on computer vision. 2015:2740-2748.
Zhang et al., Understanding deep learning requires rethinking generalization. ArXiv preprint arXiv:1611.03530v2. Feb. 26, 2017;2:1-15.
Zhang et al., Theoretically principled trade-off between robustness and accuracy. International Conference on Machine Learning. May 24, 2019:7472-7482.
Zhao et al., Large-scale category structure aware image categorization. Advances in Neural Information Processing Systems. 2011:1-9.
Zoph et al., Learning transferable architectures for scalable image recognition. Proceedings of the IEEE conference on computer vision and pattern recognition. 2018:8697-8710.

* cited by examiner

| | Hier. dist. mistake ↓ | Avg. hier. dist. @1 ↓ | Avg. hier. dist. @5 ↓ | Avg. hier. dist. @20 ↓ | Top-1 error ↓ | Top-5 error ↓ |
|---|---|---|---|---|---|---|
| CROSS-ENTROPY | 6.89 ± 0.004 | 1.90 ± 0.002 | | 7.07 ± 0.007 | 27.33 ± 0.038 | 8.91 ± 0.030 |
| DEVISE [ ] | 6.83 ± 0.005 | 2.17 ± 0.003 | 5.54 ± 0.003 | 7.04 ± 0.002 | 31.09 ± 0.058 | 10.03 ± 0.071 |
| BARZ&DENZLER [ ] | 6.72 ± 0.017 | | 5.09 ± 0.009 | 6.21 ± 0.007 | | |
| YOLO-v2 [ ] | | | 5.77 ± 0.012 | | 30.43 ± 0.030 | 9.35 ± 0.034 |
| HXE α=0.5 | 6.46 ± 0.006 | 2.10 ± 0.002 | 5.37 ± 0.003 | 6.69 ± 0.008 | 32.61 ± 0.443 | 10.21 ± 0.235 |
| HXE α=0.1 | 6.83 ± 0.009 | 2.11 ± 0.021 | 5.53 ± 0.004 | 6.89 ± 0.008 | 27.68 ± 0.066 | 8.12 ± 0.094 |
| SOFT-TARGETS β=15 | 6.83 ± 0.005 | 1.90 ± 0.003 | 5.49 ± 0.002 | 6.83 ± 0.002 | 27.78 ± 0.063 | 8.27 ± 0.035 |
| SOFT-TARGETS β=5 | 6.56 ± 0.009 | 2.29 ± 0.008 | | 6.29 ± 0.005 | 35.09 ± 0.096 | 12.92 ± 0.043 |
| CROSS-ENTROPY | | 1.05 ± 0.004 | | | 43.77 ± 0.136 | 17.34 ± 0.096 |
| BARZ&DENZLER [ ] | 2.19 ± 0.003 | | | 2.03 ± 0.003 | | |
| YOLO-v2 [ ] | 2.37 ± 0.006 | 1.07 ± 0.007 | 1.81 ± 0.008 | 2.73 ± 0.009 | 45.23 ± 0.202 | 18.91 ± 0.123 |
| HXE α=0.6 | 2.13 ± 0.003 | 1.21 ± 0.004 | 1.62 ± 0.003 | 2.68 ± 0.003 | 56.61 ± 0.241 | 24.89 ± 0.205 |
| HXE α=0.1 | 2.35 ± 0.007 | 1.04 ± 0.0004 | 1.80 ± 0.004 | 2.70 ± 0.009 | 44.28 ± 0.171 | 17.86 ± 0.081 |
| SOFT-TARGETS β=30 | 2.35 ± 0.002 | 1.05 ± 0.003 | 1.62 ± 0.005 | 2.32 ± 0.004 | 44.75 ± 0.139 | 18.72 ± 0.041 |
| SOFT-TARGETS β=10 | 2.10 ± 0.005 | 1.16 ± 0.006 | 1.47 ± 0.004 | 1.99 ± 0.003 | 55.16 ± 0.186 | 26.87 ± 0.148 |

FIG. 9

STRUCTURE DETECTION MODELS

CROSS REFERENCE TO RELATED APPLICATIONS

This application claims priority under 35 U.S.C. § 119 to United Kingdom patent application number 1916689.1, filed Nov. 15, 2019, the entire contents of which are incorporated herein by reference.

TECHNICAL FIELD

The present disclosure pertains to the training of machine learning (ML) perception models for structure detection, and to the use of such models for structure detection.

BACKGROUND

In a machine learning (ML) context, a structure perception component may comprise one or more trained perception models. For example, machine vision processing is frequently implemented using convolutional neural networks (CNNs). Such networks are typically trained on large numbers of training images which have been annotated with information that the neural network is required to learn (a form of supervised learning). At training time, the network is presented with thousands, or preferably hundreds of thousands, of such annotated images and learns for itself how features captured in the images themselves relate to annotations associated therewith. This is a form of visual structure detection applied to images. Each image is annotated in the sense of being associated with annotation data. The image serves as a perception input, and the associated annotation data provides a "ground truth" for the image.

CNNs and other forms of perception model can be architected to receive and process other forms of perception inputs, such as point clouds, voxel tensors etc., and to perceive structure in both 2D and 3D space. In the context of training generally, a perception input may be referred to as a "training example" or "training input". By contrast, training examples captured for processing by a trained perception component at runtime may be referred to as "runtime inputs". Annotation data associated with a training input provides a ground truth for that training input in that the annotation data encodes an intended perception output for that training input. In a supervised training process, parameters of a perception component are tuned systematically to minimize, to a defined extent, an overall measure of difference between the perception outputs generated by the perception component when applied to the training examples in a training set (the "actual" perception outputs) and the corresponding ground truths provided by the associated annotation data (the intended perception outputs). In this manner, the perception input "learns" from the training examples, and moreover is able to "generalize" that learning, in the sense of being able, one trained, to provide meaningful perception outputs for perception inputs it has not encountered during training.

Such perception components are a cornerstone of many established and emerging technologies. For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. Such vehicles must not only perform complex manoeuvres among people and other vehicles, but they must often do so while guaranteeing stringent constraints on the probability of adverse events occurring, such as collision with these other agents in the environments. In order for an AV to plan safely, it is crucial that it is able to observe its environment accurately and reliably. This includes the need for accurate and reliable detection of real-world structure in the vicinity of the vehicle. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on perception inputs from the sensor system. A fully-autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

SUMMARY

The present techniques pertain generally to what is referred to herein as "hierarchically informed" learning or training. The techniques can be applied in any context where a perception model is trained on a structure detection task. The present techniques have particular, but not exclusive applicability to image processing and the processing of sensor inputs more generally (such as point clouds, voxel representations or any form of structure representation) corresponding to one or more sensor modalities, such as monocular or stereo imaging, LiDAR, RADAR etc. Models which process such inputs to detect or otherwise interpret structure therein may be referred to as perception models.

Structure detection may be implemented herein as a classification task, such as image classification (classifying whole images), object detection (classifying image regions), segmentation (pixel-level classification) etc.

A first aspect of the present disclosure provides a computer-implemented method of training a perception model to classify inputs in relation to a discrete set of leaf node classes. In a structured training process, parameters of the perception model are adapted to optimize an empirical risk with respect to a set of training inputs. Each training input is assigned to a ground truth leaf node class. The empirical risk is defined as a combination of individual losses. For each training input, the perception model outputs a classification score for each leaf node class. Each individual loss is defined as a loss function applied to one of the training inputs and its ground truth leaf node class. The loss function is defined with respect to a hierarchical classification tree encoding hierarchical relationships between the ground truth leaf node classes. The loss function is dependent on the classification score for that training input and its ground truth leaf node class but also the classification scores for at least some others of the leaf node classes, with the classification scores of the other leaf node classes weighted in dependence on their hierarchical relationship to the ground truth leaf node class within the hierarchical classification tree.

The hierarchical classification tree encodes hierarchical relationships between the leaf node classes in a tree structure. The loss function is defined with respect to the hierarchical classification tree to encode an understanding that certain classification mistakes are worse than others.

A core problem addressed herein is that of avoiding "bad" errors, i.e. classification errors that are materially worse than others within this framework. In many practical contexts, it may be that a small reduction in classification accuracy in return for a significant reduction in bad classification errors represents an acceptable trade-off.

Further aspects herein provide a training computer system comprising one or more computers programmed or otherwise configured to implement the above method, and a computer program for programming a computer system to implement the method.

Further aspects herein provide a perception system comprising one or more processors programmed or otherwise-configured to implement a perception model trained as above, and a computer program product for programming such a perception system to implement such a perception model. That is, a trained perception model embodied in a computer system or computer program.

BRIEF DESCRIPTION OF FIGURES

For a better understanding of the present disclosure, and to show how embodiments may be carried into effect, reference is made by way of example only to the following figures in which:

FIG. 9 shows tabulated results of various classification methods subject to evaluation.

DETAILED DESCRIPTION

1. Overview

Deep neural networks have improved image classification dramatically over the past decade, but have done so by focusing on performance measures that treat all classes other than the ground truth as equally wrong. This has led to a situation in which mistakes are less likely to be made than before, but are equally likely to be absurd or catastrophic when they do occur.

One example of a perception model is an image classification network trained to detect visual structure in images. Image classification networks have improved greatly over recent years, but generalisation remains imperfect, and some level of test-time errors will occur in practice. Conventionally, such errors are defined with respect to a single ground-truth class and reported using one or more top-k measures (k typically set to 1 or 5).

Figure 1:
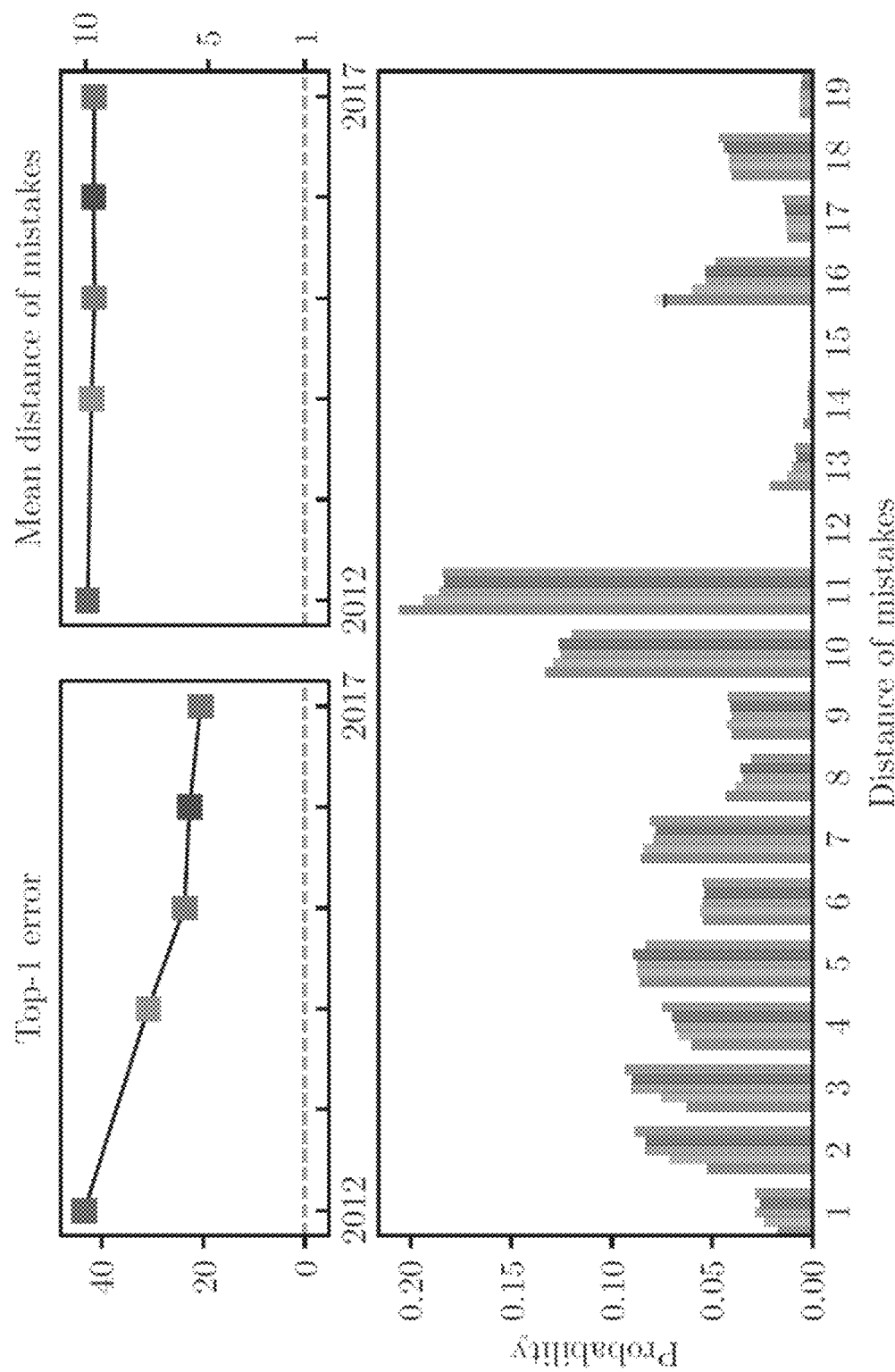
FIG. 1 shows top-1 error and distribution of mistakes for various state of the art image classification networks.

For context, FIG. 1 shows top-1 error and distribution of mistakes with respect to the known WordNet hierarchy for well-known deep neural network architectures on ImageNet. The top-1 error has enjoyed a spectacular improvement in the last few years, but even though the number of mistakes has decreased in absolute terms, their severity has remained fairly unchanged over the same period.

FIG. 1 shows results for the following baseline networks, from left to right: AlexNet (2012), VGG-11 (2014), ResNet-50 (2015), DenseNet-161 (2016), and ResNeXt-101 (2017).

However, this practice imposes certain notions of what it means to make a mistake, including treating all classes other than the "true" label as equally wrong. This may not actually correspond to human intuitions about desired classifier behaviour, and for some applications this point may prove crucial. Take the example of an autonomous vehicle observing an object on the side of the road: whatever measure of classifier performance is used, it is likely that mistaking a lamppost for a tree is less of a problem than mistaking a person for a tree. To take such considerations into account, a nontrivial model of the relationships between classes is incorporated, rethinking more broadly what it means for a network to "make a mistake".

Since the advent of deep-learning, virtually no regard has been given in the field of computer vision to the problem of making better classification mistakes (in a hierarchical sense).

Herein, two example baselines methods are described that modify a cross-entropy loss and are able to outperform existing state of the art methods. Improvements in this task can be made, though may be an acceptable tradeoff balance between standard top-1 accuracy and mistake severity. Moreover, we observed that the quality of the results is greatly influenced by the nature of the hierarchy underpinning the dataset.

In the described embodiments, a structured training method is described that can be applied to deep neural networks and other forms of perception model that are trainable via loss function optimization using modem methods (such as gradient descent). Underpinning the described techniques is an acceptance that even well-trained perception models will sometimes make mistakes (classification errors in the described examples). As indicated, the aim is not necessarily minimizing the number of mistakes; rather it is about ensuring that, to the extent the perception model does make mistakes, it makes "better" mistakes in a well-defined sense.

A "hierarchical classification tree" is used to define the notion of "better" mistakes in concrete terms that can be leveraged in training; it does so by encoding hierarchical relationships between ground truth leaf node classes of the hierarchical classification tree. This may be referred to herein as "hierarchically-informed" learning or training. An example of such a tree that can be used to represent these class relationships is a taxonomic hierarchy tree.

One example context is an autonomous vehicle (AV) context, in which, for example, the hierarchical classification tree may be structured to encode an understanding into the training of the perception model that particular classification errors, identified as potentially safety-critical, are worse than others, that are less critical in terms of safety.

Figure 6A:
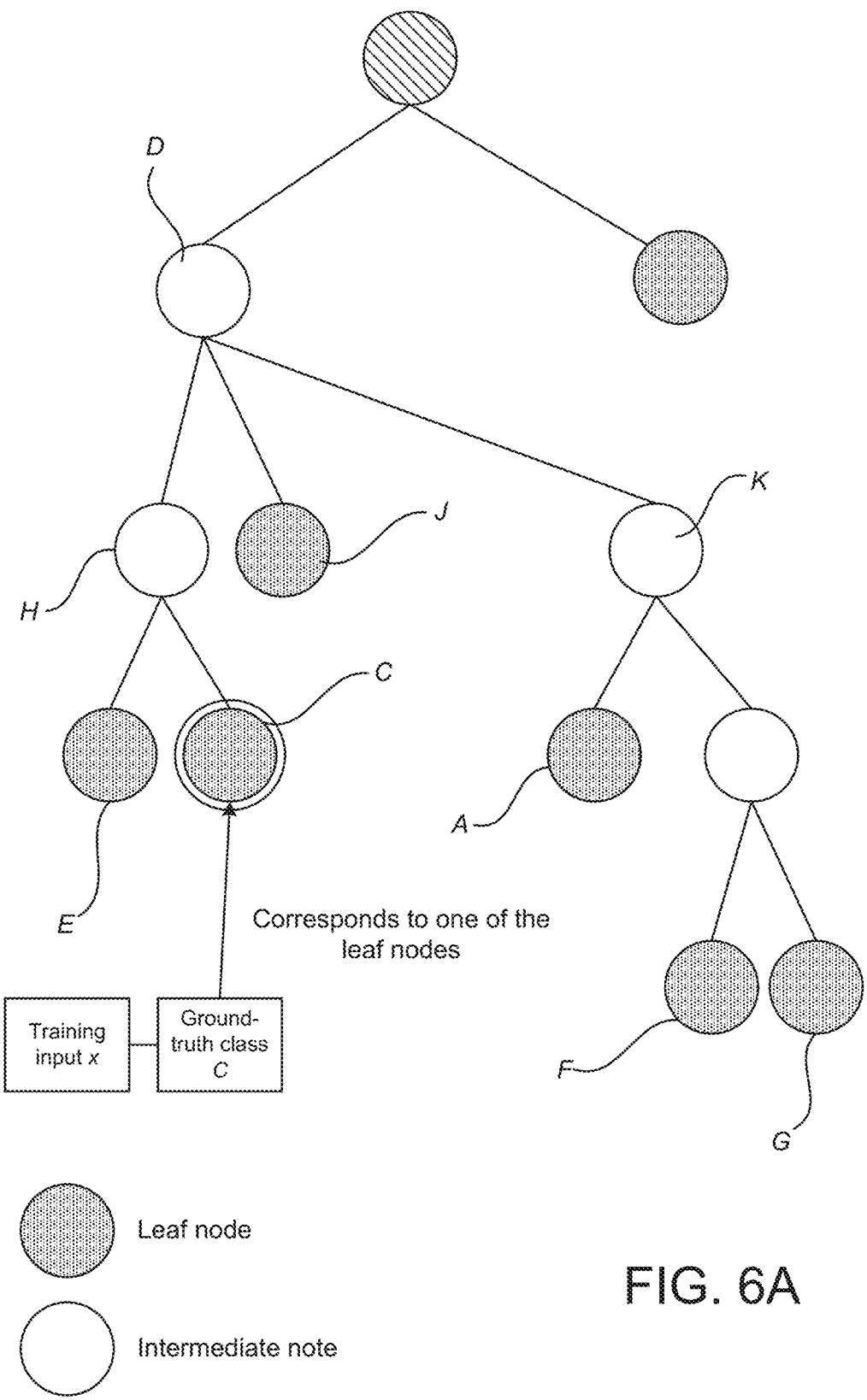
FIG. 6A shows a hierarchical classification tree encoding hierarchical relationships between classes.

FIG. 6A shows an example of a possible hierarchical classification tree having leaf nodes, intermediate nodes and a root node O, joined by edges representing hierarchies within the tree. The root node is at the top of the hierarchy (level 0). A leaf node is a node having no child nodes within the hierarchy. An intermediate node is a node other than the root node O having at least one child node, which could itself be a leaf node or a non-leaf node. Leaf nodes can occur at any level other than zero.

Each leaf node is represented by black dotted circle; the nodes labelled A, C, E, F, G and J are examples of leaf nodes. Each leaf node corresponds to one of the leaf node classes over which the perception model classifies its inputs. Each leaf node is directly connected to one non-leaf node (its parent). The non-leaf nodes consist of a single common root node O to which all other nodes are directly or indirectly connected, and a number of intermediate nodes (represented as white circles). The intermediate nodes include the nodes labelled D, H and K. Some intermediate nodes are connected to other intermediate nodes. Any non-leaf node to which a leaf node is directly connected (by an edge between those nodes) or indirectly connected (via at least one other intermediate node) is referred to as an "ancestor" of that leaf node, and any leaf node directly or indirectly connected to a given non-leaf node is a "descendant" (child or grandchild) of that non-leaf node. Nodes are said to be connected by edges of the tree.

Figure 6B:
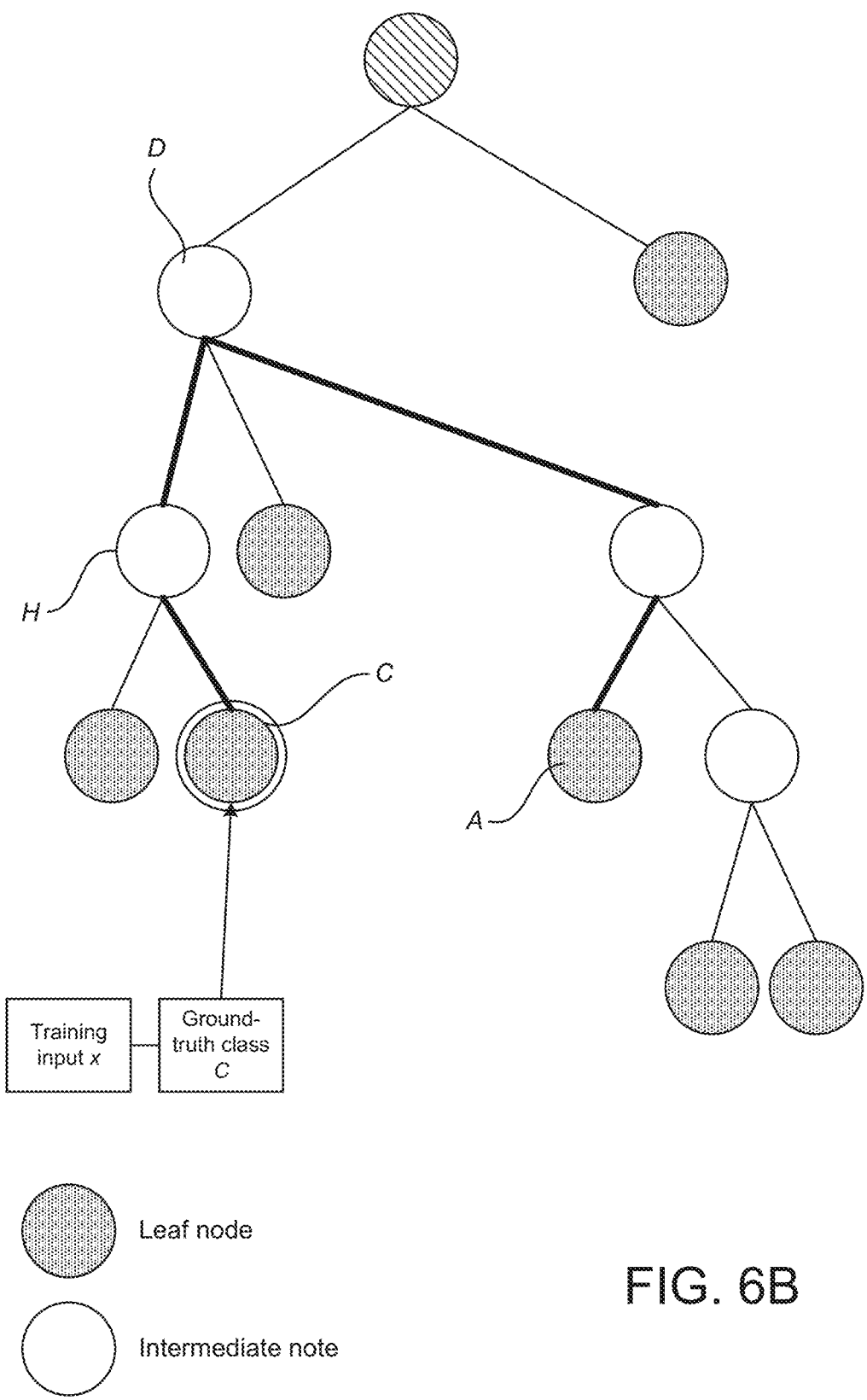
FIG. 6B shows a lowest common ancestor (LCA) of two leaf nodes.
Figure 6C:
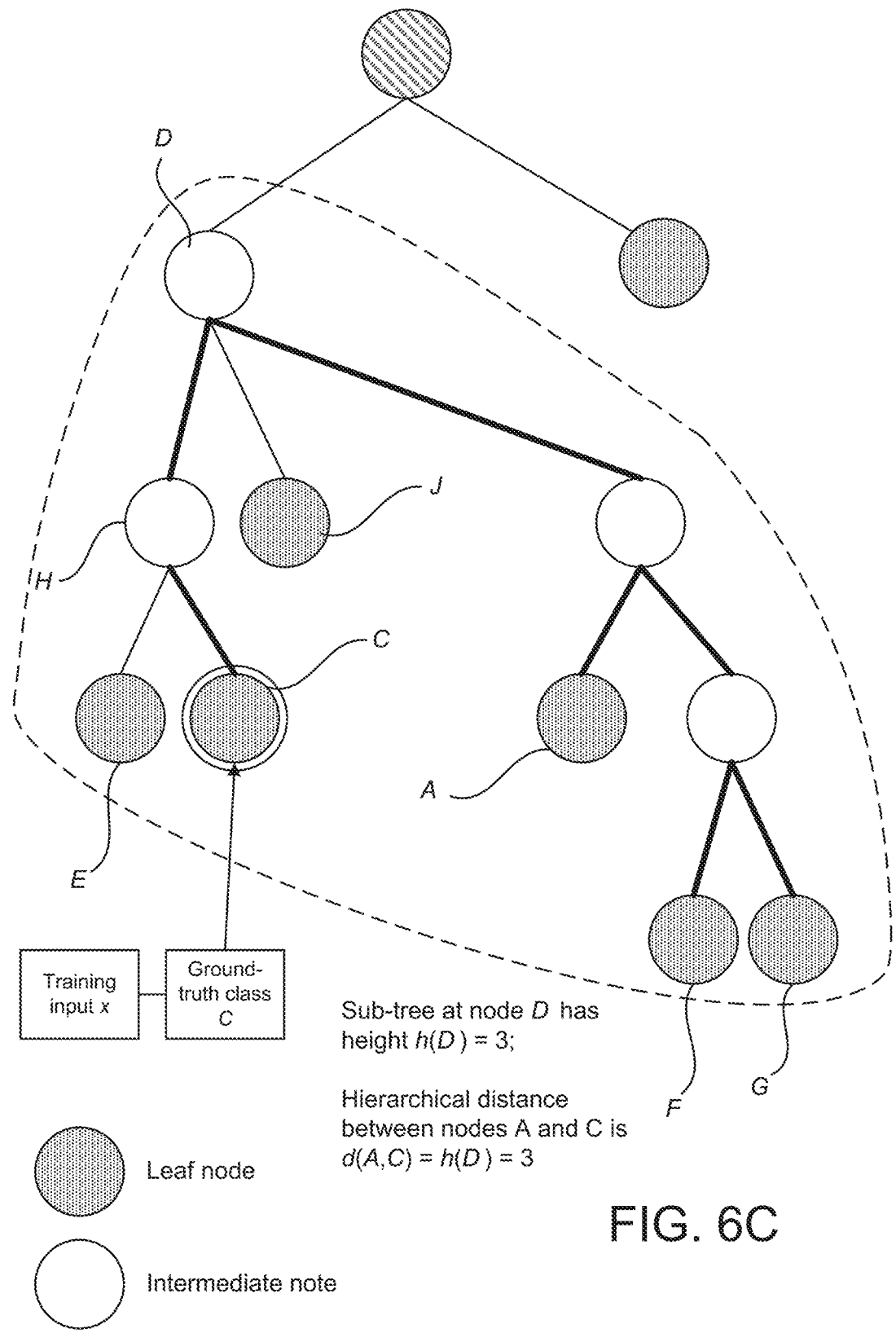
FIG. 6C shows a second subtree defined by a second intermediate node.

FIGS. 6B and 6C illustrate the concept of a "hierarchical distance" between any two leaf nodes, such as leaf nodes A and C. The hierarchical distance between two leaf nodes is defined in relation to their "lowest common ancestor" (LCA)—the node D being the lowest common ancestor of nodes A and C in this example.

The lowest common ancestor of two leaf nodes is defined as the lowest-level node in the tree that is an ancestor of both leaf nodes, and the hierarchical distance between those nodes is defined as a "height" of their lowest common ancestor.

With reference to FIG. 6C, the hierarchical distance between A and C, denoted as d(A,C), is equal to the height of their lowest common ancestor D, h(D), i.e. d(A,C)=h(D). The height of the node D (or indeed of any node) is defined as the height of a sub-tree defined by that node, i.e. the sub-tree with D as its root node and which includes all of the descendants of that node D. In this example, the sub-tree defined by D has a height of three, due to the presence of the lowest-level leaf nodes of the sub-tree—F and G—each of which is three "hops" away from D (i.e. each is connected to D by a total of 3 edges).

Figure 6D:
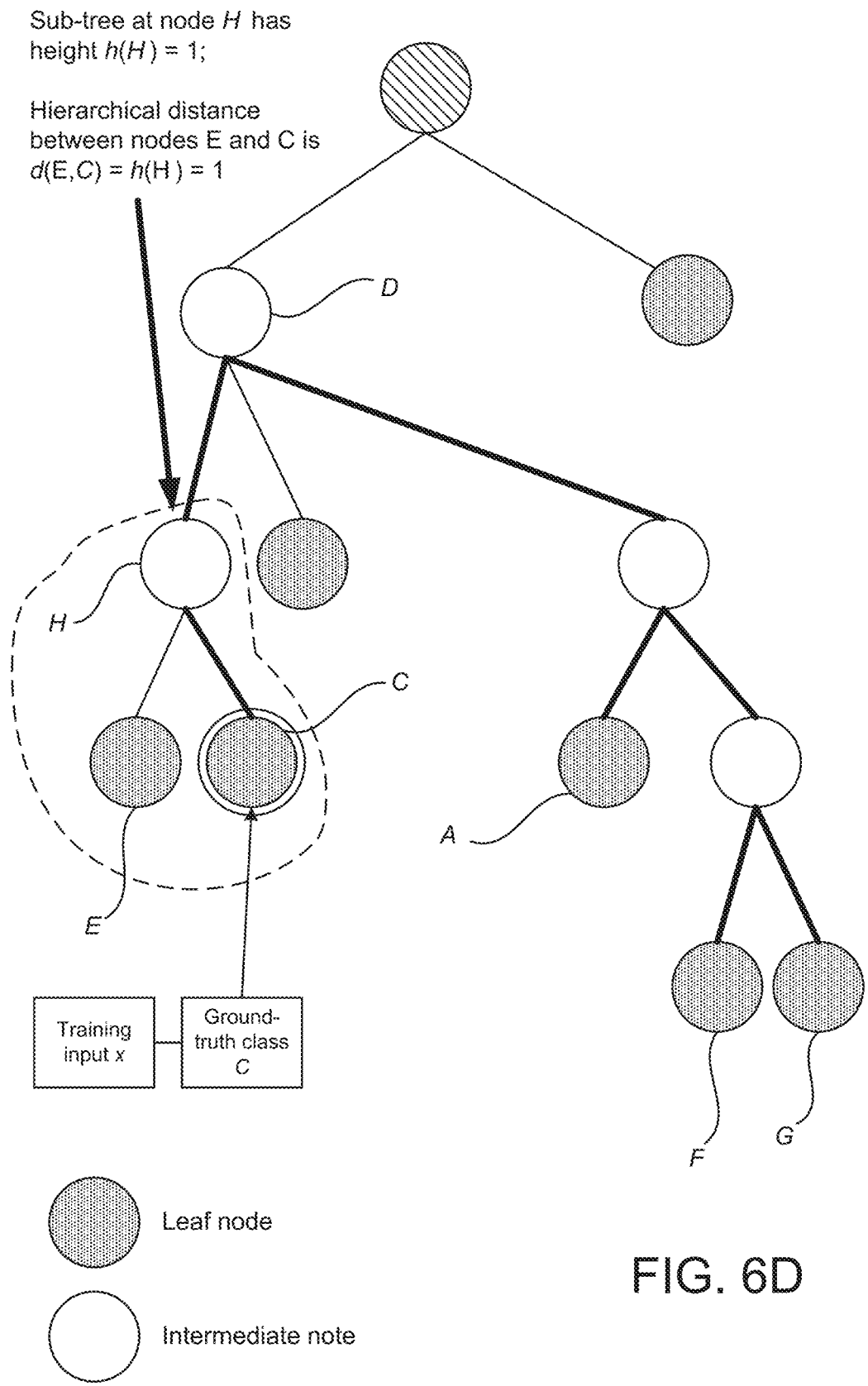
FIG. 6D shows a first subtree defined by a first intermediate node.

As another example, as illustrated in FIG. 6D, the subtree defined by the node H can be seen to have a height of 1, because it only has direct children, namely the nodes C and E—consequently, the hierarchical distance between nodes C and E is one, i.e. d(C,E)=h(H)=1, because H is the lowest common ancestor of C and E.

A brief overview of how such a hierarchical classification tree may be used in hierarchically-informed learning. The described examples consider the case of a perception model trained to perform classification over a set of classes, such as image classes in the case of image classification, or structure classes in the case of structure recognition more generally.

Figure 8:
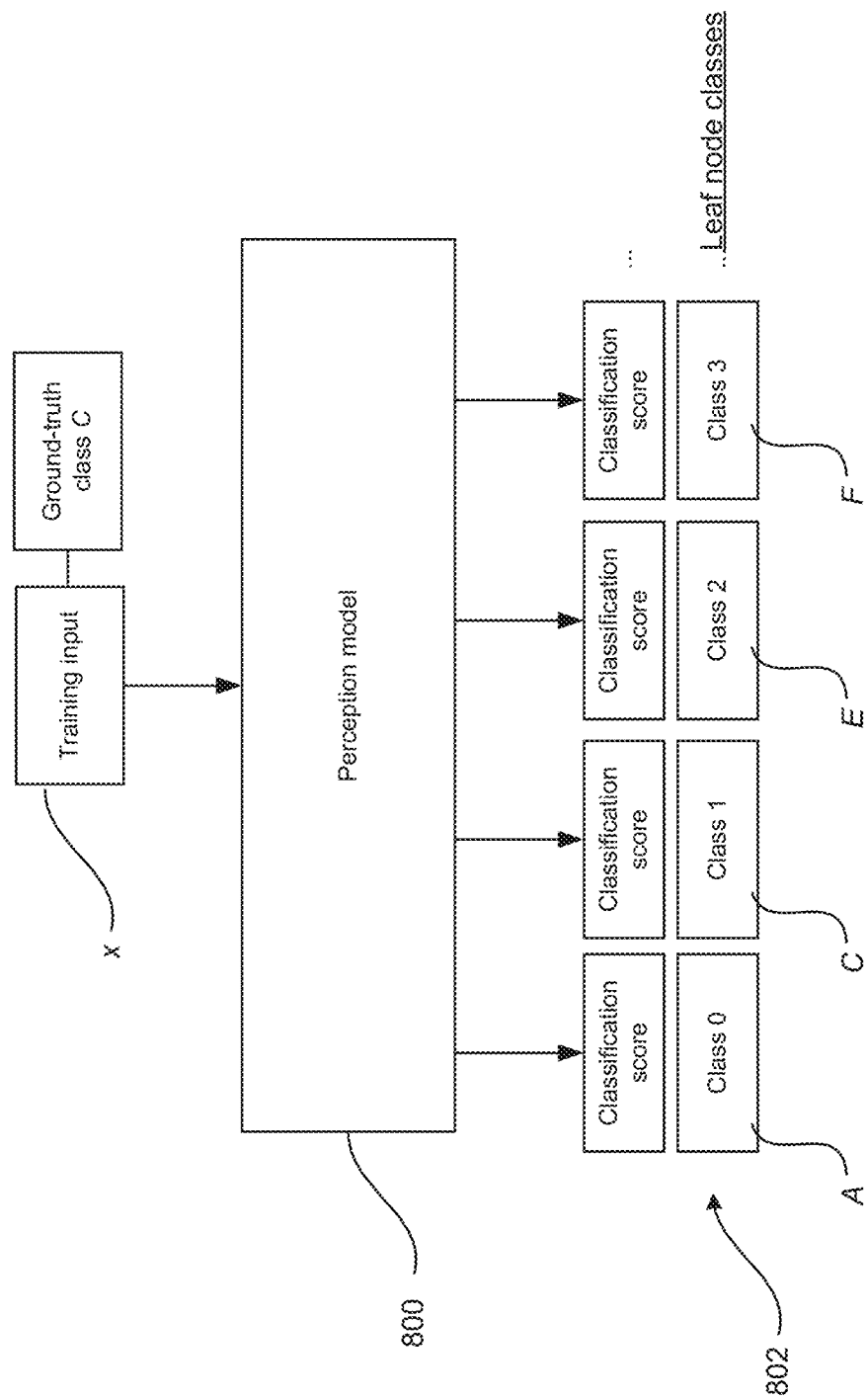
FIG. 8 shows a schematic block diagram of a perception model under training.

FIG. 8 shows a highly schematic block diagram of a perception model 800 that receives a perception input x of a training set (set of training inputs), and processes the training input x to generate classification scores for respective classes. The perception model 800 could for example take the form of a convolutional neural network (CNN) or other form of neural network.

The classes over which classification is performed correspond to leaf nodes of a hierarchical classification tree of the kind depicted in FIG. 6A, and may be referred to as "leaf-node classes". The hierarchical classification tree encodes hierarchical relationships between the leaf node classes that can usefully inform the training. By way of example, FIG. 8 shows a four leaf node classes corresponding to the leaf nodes A, C, E and F of the hierarchical classification tree of FIG. 6A (other leaf node classes are omitted for conciseness).

Each training input of the training set is assigned a ground truth leaf node that corresponds to one of the leaf nodes (e.g. one of the leaf nodes A, C, E, F or G in FIG. 6A). That is to say, each training input is labelled with a ground truth class—note, the described techniques do not require any special form of labelling, i.e. there is no additional labelling/annotation burden compared with existing training methods. The differences stem from the manner in which the labels are used in training.

The training input x is shown to be assigned to ground truth leaf node class C. Note, in the mathematical definitions below, C is a variable representing whichever ground truth leaf node class is assigned to a particular training input (i.e. when used in that context, C may denote different leaf node classes for different training inputs). For conciseness, the following description may refer the ground truth leaf node class C for training input x.

The perception model 800 is trained based on an "empirical risk" that is optimized with respect to the set of training inputs. The empirical risk is defined as a combination of individual losses, where each individual loss is defined as a loss function applied to one training input and its ground truth leaf node class.

During training, for each training input, the perception model outputs a classification score for each leaf node class. However, the loss function is dependent no only on the classification score for that training input and its ground truth leaf node class, but also the classification scores for at least some others of the leaf node classes, with the classification scores of the other leaf node classes weighted in dependence on their hierarchical relationship to the ground truth leaf node class within the hierarchical classification tree.

Various example implementations are described below. A first implementation uses encompass a "hierarchical cross entropy" (HXE) loss function. A second implementation uses a soft cross entropy" (SXE) loss function.

For the HXE loss function, for a given training input having a particular ground truth leaf class, the classification scores of the other leaf node classes may be weighted by determining a path through the hierarchical classification tree from the ground truth leaf node class C (i.e. from the leaf node of the tree corresponding to the ground truth leaf node class) to the root node O of the tree. The HXE loss function comprises a weighted conditional probability term for each node on the path that is determined as an aggregation (e.g. summation) of the classification scores for all of the leaf node classes that are descendants of the that path node (i.e. that form part of the sub tree defined by that path node), in proportion to an aggregation of the of the classification scores for all of the leaf node classes that are descendants of the node that is an immediate parent of that path node (i.e. the node one hop above it along the path to the root node).

The conditional probability term for each path node may, for example, be weighted in dependence on the height of the subtree defined by that path node.

Figure 7A:
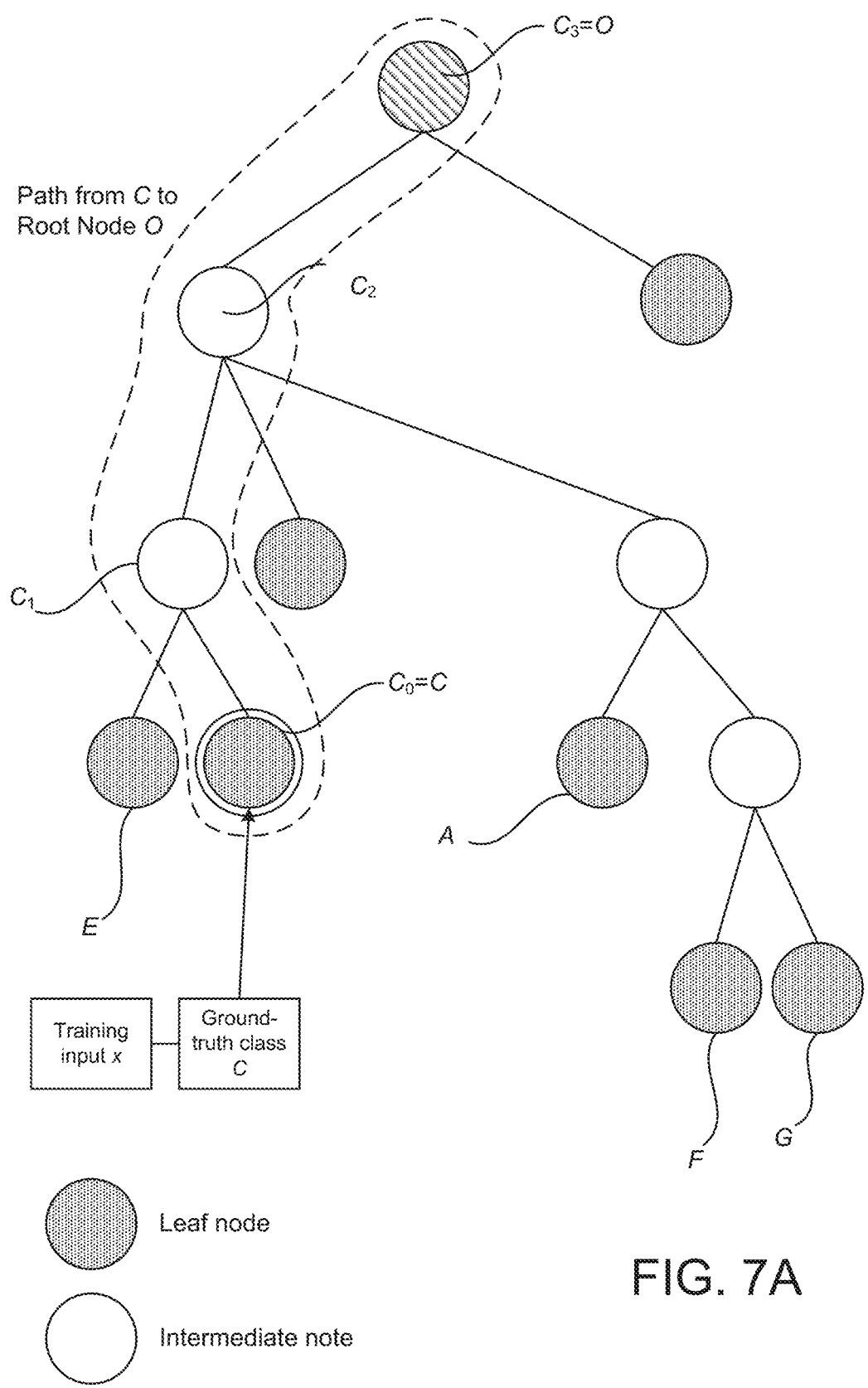
FIG. 7A shows a path from a leaf node to a root node.

By way of example, FIG. 7A shows a path determined for the ground truth leaf-node class C. There are four nodes along the path: $C=C_0$, $C_1$, $C_2$ and $C_3=0$ (the root note or "origin").

Figure 7B:
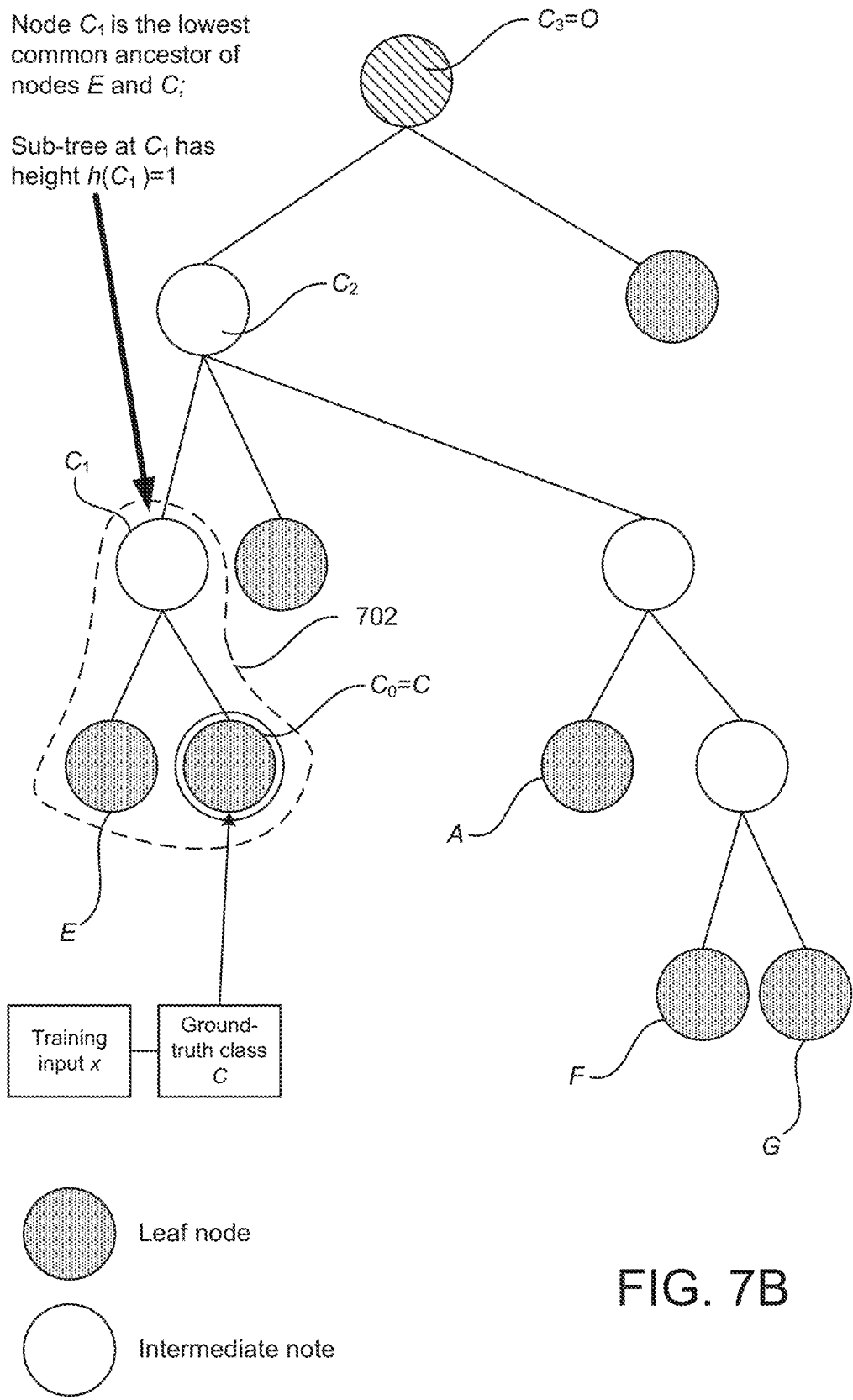
FIG. 7B shows a first subtree defined by a first path node.

FIG. 7B shows a sub-tree 702 defined by the path node $C_1$—its descendants are C and E. The height of this subtree is $h(C_1)=1$ ($C_1$ is labelled H in other figures).

Figure 7C:
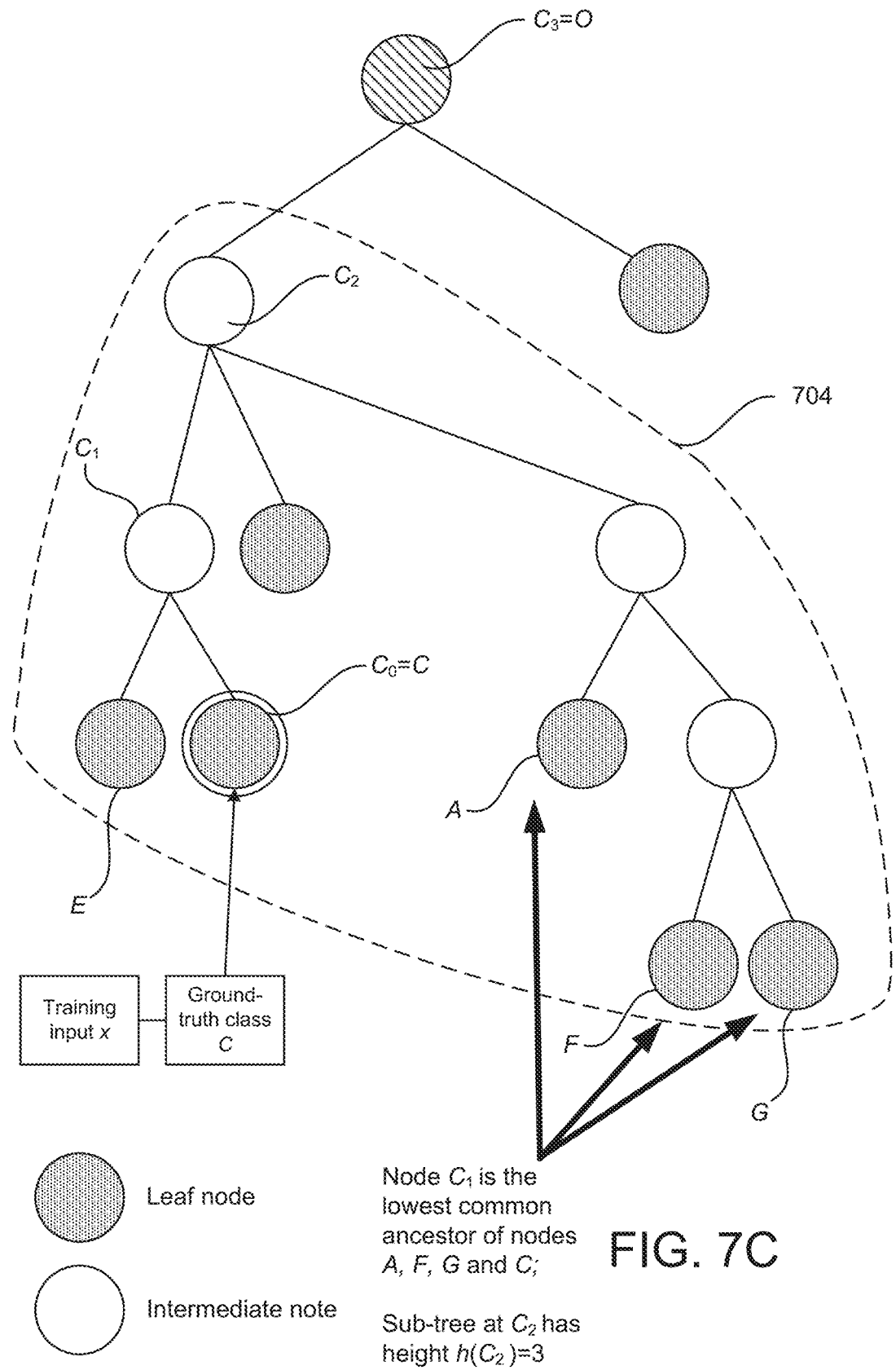
FIG. 7C shows a second subtree defined by a second path node.

FIG. 7C shows a sub-tree 704 defined the path node $C_2$—which has the additional descendants A, F and G. The height of this subtree is $h(C_2)=3$ ($C_2$ is labelled D in other figures).

In this case, the term of the loss function for the path node $C_1$ would be the aggregation of the classification scores for C and E (descendants of $C_1$), in proportion to the aggregation of the classification scores for C, E, A, F, G (descendants of $C_2$), and would be weighted in dependence on $h(C_1)=1$.

Likewise, the term of the loss function for the path node $C_2$ would be the aggregation of the classification scores for C, E, A, F, G (descendants of $C_2$), in proportion to the aggregation of the classification scores for all other lead nodes (descendants of $C_3$, which happens to be the root node O in this example), and would be weighted in dependence on $h(C_2)=3$. etc.

In the second implementation, the SXE loss function optimized in training comprises a term for each leaf node class, which is dependent only on the classification score for that leaf node class, and a weighting factor is applied to that term which is dependent on a hierarchical distance between that leaf node class and the ground truth leaf node class.

SXE as it is described below has an explicit dependence on hierarchical distance. Whilst HXE, as it is described below, does not have an explicit dependence on hierarchical distance, it nonetheless has a degree of implicit dependence on hierarchical distance, as illustrated in FIGS. 8B and 8C:
- in FIG. 8B, it can be seen that the path node $C_1$ is the lowest common ancestor of C and the other descendant(s) of $C_1$ by definition ($C_1$ is the immediate parent of C by definition)—the other descendant being E in this case. The conditional probability term for $C_1$ is weighted in dependence on the height of the subtree defined by $C_1$-which by definition is the hierarchical distance between C and E. In mathematical terms, defining Leaves($C_n$) as the (sub)set of leaf nodes in the (sub)tree defined by $C_n$, it can be seen that $C_1$ is the lowest common ancestor of C and each of the nodes in the set Leaves($C_1$)–{C} (i.e. all nodes in Leaves($C_1$) other than C itself).
- In FIG. 8C, it can be seen that the path node $C_2$ is the lowest common ancestor of C and each of the nodes in the set Leaves($C_2$)—Leaves($C_1$) (i.e. each descendant of $C_2$ that is not a descendant of $C_1$)—in this example, $C_2$ being the lowest common ancestor of C and each of A, F and G. The conditional probability term for $C_2$ is weighted in dependence on $h(C_2)$—which by definition is the hierarchical distance between C and each of A, F and G.
etc.

Hence, it can be seen that, even in the HXE case, the weighting of conditional probability terms has a degree of implicit dependence on hierarchical distance, as a consequence of the manner in which the conditional probability terms are defined.

In general, high-level terms, the effect of this dependence in the loss functions is to train the perception model in a way that particularly discourages training inputs from being wrongly classified as belonging to a class that has a relatively high hierarchical distance from its ground truth class. Put another way, given a ground truth class C for a given training input x and two other classes A and B, $$d(C,A)<d(C,B)$$

implies that wrongly classifying x as belong to B is worse than wrongly classifying x and belonging to A, where d(C,A) is the hierarchical distance between C and A and d(C,B) is the hierarchical distance between C and B. More concisely, a greater hierarchical distance from the "correct" class implies a worse classification error. That knowledge about the relative "severity" of different classification errors informs the training of the perception model.

The term leaf node class is used to refer to a class corresponding to a leaf node of the hierarchical classification tree. In the examples described later, the perception model does not necessarily perform "hierarchical classification" as such, i.e. it may only classify a given input in relation to the leaf node classes and may not explicitly classify it in relation to any "higher-level" classes corresponding to intermediate nodes. However, even when the classification is not hierarchical in that sense, the training of the perception model is nonetheless hierarchically informed, with the associated benefits set out herein.

2. Example Framework

Further details of example implementation will now be described. The described embodiments leverage class hierarchies with deep networks to help networks make better mistakes in the above sense. In the following examples, the perception model 800 is implemented as a neural network, having parameters θ that are learned in training, and whose classification scores encode an output distribution $p_\theta(x_i,\cdot)$ for a given training input $x_i$.

Referring again to FIG. 1, it can be seen that, while the flat top-1 accuracies of state-of-the-art classifiers have improved to impressive levels over the years, the distributions of the severities of the errors that are made have changed very little over this time. This may be due, at least in part, to the scarcity of any modern learning methods that attempt to exploit prior information and preferences about class relationships in the interest of "making better mistakes", whether this information is sourced from an offline taxonomy or otherwise.

A framework is described for formulating methods relevant to the problem of making better mistakes on image classification, beginning with the standard supervised setup. A training set $$S=\{(x_i,C_i)\} i=1,\ldots,N$$

pairs N images $x_i \in I$ with class labels $C_i \in C$, a set of M target classes. θ parametrises a network architecture implementing functions $p_\theta: I \times C \to [0,1]$, where $\forall x, p_\theta(x,\cdot)$ is a categorical distribution over C. The classifier is then defined by learning a value for θ which minimises an empirical risk $$\frac{1}{N}\sum_{i=1}^{N}\mathcal{L}(p\theta(x_i,\cdot),y(C_i))+\mathcal{R}(\theta)$$

in which a loss function $\mathcal{L}$ compares the classifier's output distribution $p_\theta(x_i,\cdot)$ to an embedded representation $y(C_i)$ of each example's class, and $\mathcal{R}$ is a regulariser.

Under choices such as cross entropy for $\mathcal{L}$ and a one-hot embedding for y, it can be seen that the framework is agnostic of relationships between classes. The question is how such class relationships $\mathcal{H}$ can be incorporated into the loss in Eqn. 1. The following examples consider three approaches:

1. Replacing class representation y(C) with an alternate embedding $y\mathcal{H}$ (C). Such "label-embedding" methods can draw their embedding both from taxonomic hierarchies and alternative sources. Label embedding method map class labels to vectors whose relative locations represent semantic relationships, and optimise a loss on these embedded vectors.
2. Altering the loss function $\mathcal{L}$ in terms of its arguments to produce $$\mathcal{L}\mathcal{H}_{(p_\theta(x_i,\cdot),y(C_i))},$$

i.e. making the penalty assigned to a given output distribution and embedded label dependent on H. In methods using such "hierarchical losses, the loss function itself is parametrised by the class hierarchy such that a higher penalty is assigned to the prediction of a more distant relative of the true label.
3. Altering the function $p_\theta(x,\cdot)$ to $p_\theta\mathcal{H}$ $(x,\cdot)$. Since there is no clear motivation for direct modification of the input data x, the only form this takes in practice is to change to the parametrisation of p by $\theta$, i.e. architectural changes to the network. This may, for example, be implemented through hierarchical restructuring of the layers of the network, and such methods, covered in Sec. 2.3, are referred to herein as having "hierarchical architectures". These methods attempt to incorporate class hierarchy into the classifier architecture without necessarily changing the loss function otherwise. The core idea is to "divide and conquer" at the structural level, with the classifier assigning inputs to "superclasses" at earlier layers and making fine-grained distinctions at later ones.

3. Example Training Method

This section outlines two methods that encourage classifiers to make better mistakes by incorporating class hierarchies. In Sec. 3.1, a hierarchical cross entropy (HXE) is described, which is one example of a hierarchical loss. This approach expands each class probability into a chain of conditional probabilities defined by its unique lineage in a given hierarchy tree. It then reweights the corresponding terms in the loss so as to penalise higher-level mistakes more severely. In Sec. 3.2, an example embedding function to implement the label embedding framework is described. The resulting soft labels are PMFs (probability mass functions) over C whose values decay exponentially with respect to an LCA-based distance to the ground truth.

3.1. Hierarchical Cross-Entropy

When $\mathcal{H}$ has a tree structure, it corresponds to a unique factorisation of the categorical distribution p(C) in terms of the conditional probabilities along the path connecting each class to the origin of the tree. Denoting the path from a leaf node C to the origin O as $C^{(0)},\ldots,C^{(h)}$, the probability of class C can be factorised as $$p(C)=\prod_{l=0}^{h-1}p(C^{(l)}\mid C^{(l+1)}), \quad (2)$$

where $$C^{(0)}=C, C^{(h)}=O,$$

and $$h=h(C)$$

is the height of the node C. Note that the last term $p(C^{(h)})=p(O)=1$ is omitted. Conversely, the conditionals can be written in terms of the class probabilities as $$p(C^{(l)}\mid C^{(l+1)})=\frac{\sum_{A\in Leaves(C^{(l)})}p(A)}{\sum_{B\in Leaves(C^{(l+1)})}p(B)}, \quad (3)$$

where Leaves(C) denotes the set of leaf nodes of the sub-tree starting at node C. Note that the number of conditional probabilities is different from the number of class probabilities, but the two descriptions are equivalent because conditional probabilities have a different normalisation than the class probabilities.

A direct way to incorporate hierarchical information in the loss is to hierarchically factorise the output of the classifier according to Eqn. 2 and define the total loss as the reweighted sum of the cross-entropies of the conditional probabilities. This leads us to define the hierarchical cross-entropy (HXE) as $$\mathcal{L}_{HXE}(p,C)=-\sum_{l=0}^{h(C)-1}\lambda(C^{(l)})\log p(C^{(l)}\mid C^{(l+1)}), \quad (4)$$

where $\lambda(C^{(l)})$ is the weight associated with the edge node $C^{(l-1)}$ $C^{(l)}$, see FIG. 2(a). Even though this loss is expressed in terms of conditional probabilities, it can be easily applied to models that output the class probabilities using equation 3. Note that the reweighting in equation 4 is not equivalent to reweighting the cross-entropy for each possible ground truth class independently as done, for instance, in [16, 6]. While the latter does introduce preferences for certain classes, it fails to incorporate hierarchical information in general.

Figure 2:
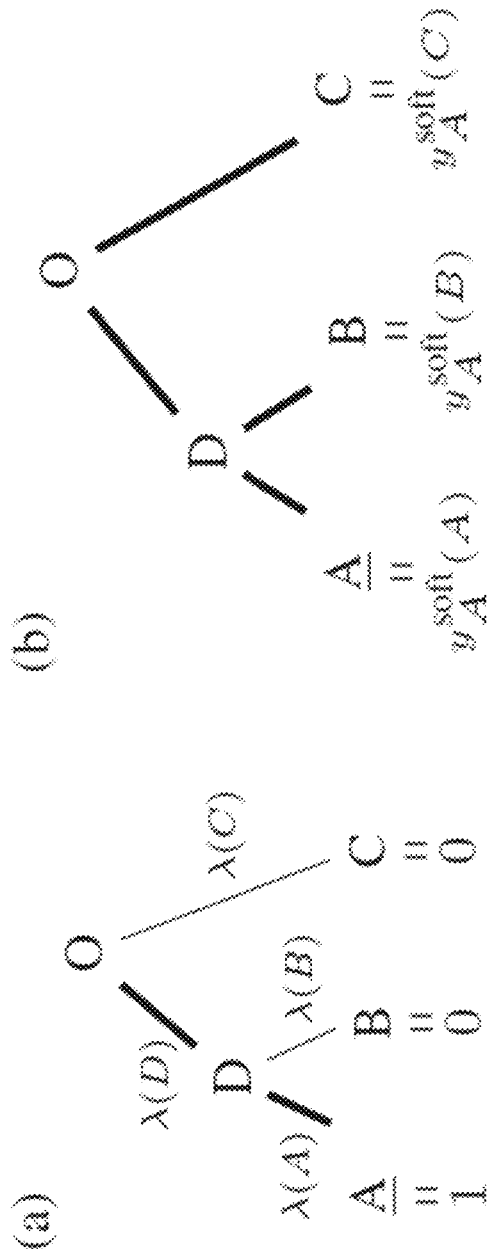
FIG. 2 shows example representations of (a) a hierarchical cross entropy (HXE) loss and (b) a soft-labels loss for a simple illustrative hierarchy.

FIG. 2 shows representations of the HXE loss (Sec. 3.1) and the soft-labels loss (Sec. 3.2) for a simple illustrative hierarchy in subfigure (a) and (b) respectively. The ground-truth class is underlined, and the edges contributing to the total value of the loss are drawn in bold.

Equation 4 has an interesting interpretation in terms of information theory: each term p $C^{(l)}$ $C^{(l+1)}$ corresponds to the information required to go from node $C^{(l+1)}$ to $C^{(l)}$. Therefore, HXE corresponds to discounting the information associated with each of these steps differently. Note that, with the factorisation of Eqn. 4, the standard cross-entropy loss is a limit case obtainable by setting all the $\lambda(C^{(l)})$ to 1. This limit case, which was briefly mentioned by Redmon and Farhadi in their YOLO-v2 paper [23], results only in architectural changes but does not incorporate hierarchical information in the loss directly.

One possible choice for the weights is to take $$\lambda(C) = \exp(-\alpha h(C)), \quad (5)$$

where h(C) is the height of node C and $\alpha > 0$ is a constant controlling the decay. This corresponds to discounting information down the hierarchy exponentially, i.e. encoding a preference for conditional probabilities higher up in the hierarchy. While such a definition has the advantage of simplicity and interpretability, there are other meaningful weightings, such as ones depending on a branching factor or encoding a preference towards specific classes.

3.2 Soft Labels

A second approach to incorporating hierarchical information, soft labels, is a label-embedding approach as described above. As before, these methods use a mapping function y(C) to associate classes with representations which encode class-relationship information that is absent in the trivial case of the one-hot representation. This can be done within any loss function.

The following examples consider a mapping function $y^{soft}(C^t)$ which, for each given target class $C^t$, outputs a categorical distribution $q_{C^t}(C)$ over C, parametrised by $C^t$. This enables the use of a cross-entropy loss:

$$\mathcal{L}_{Soft}(p(x', \cdot), C^t) = H(y^{soft}(C^t), p(x', \cdot)) \quad (6)$$

$$= -\sum_{C \in \mathcal{C}} q_{C^t}(C) \log p(x', C),$$

where the soft label representation is itself defined as $$y^{soft}(C^t) = q_{C^t}(C) = \frac{\exp(-\beta d(C', C))}{\sum_{B \in \mathcal{C}} \exp(-\beta d(C', B))}, \quad (7)$$

for class distance function d and "hardness" parameter $\beta$. In the case of a one-hot encoding, the cross-entropy reduces to a single-term log-loss expression, but as the values of the PMF $q_{C^t}(C)$ are generally non-zero, the full sum is evaluated here: see FIG. 2(b). For the distance function $d(C_i, C_j)$, the height of $LCA(C_i, C_j)$ divided by the tree height is used. To understand the role of $\beta$ as a hardness parameter, note that values of $\beta$ that are much bigger than the typical inverse distance in the tree result in a label distribution $y^{soft}(C^t)$ that is nearly one-hot, while very small values of $\beta$ produce one that is near-uniform. Between these extremes, greater probability mass is assigned to classes more closely related to the ground truth, with the severity of the difference controlled by $\beta$.

Regarding the motivation of this representation (besides its ease), there are various complementary interpretations. For one, the distribution describing each target class can be considered to be a model of the actual uncertainty that a labeller (e.g. human) would experience due to visual confusion between closely related classes. It could also be thought of as encoding the extent to which a common response to different classes is required of the classifier, i.e. the imposition of correlations between outputs, where higher correlations are expected for more closely related classes.

One application of a trained perception model is to process sensor inputs in an autonomous vehicle. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver.

The term sensor data encompasses both real sensor data, captured using one or more physical sensors, but also simulated sensor data, which may for example be generated for the purpose of training (and may be referred to as synthetic training data in that context), testing, validation etc. For example, in an AV context, simulation may be performed for safety testing or more generally performance testing, and a trained perception model may be run within a simulated runtime stack.

Although aspects and embodiments of the invention may be presented in the context of perception, image processing etc., the present techniques can be applied more generally to any form of model to train it to interpret structure or patterns in any form of data.

A computer system comprises execution hardware which may be configured to execute the method/algorithmic steps disclosed herein and/or to implement a model trained using the present techniques. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

4. Evaluation

The training method described above have been subject to evaluation to demonstrate their efficacy. The results are set out below. The specific architectures and parameters set out below relate to the experimental set up that was used for the purpose of these experiments, and are purely illustrative.

In the following, we first describe the datasets (Sec. 4.1) and metrics (Sec. 4.2) comprising the setup common to all of our experiments. Then, in Sec. 4.3, we empirically evaluate our two simple proposals and compare them to the prior art. Finally, we experiment with random hierarchies to understand when and how information on class relatedness can help classification.

4.1. Datasets

In our experiments, we use tieredImageNet [24] (a large subset of ImageNet/ILSVRC'12 [27]) and iNaturalist'19 [29], two datasets with hierarchies that are a) significantly different from one another and b) complex enough to cover a large number of visual concepts. ImageNet aims at populating the WordNet [19] hierarchy of nouns, which has been generated by inspecting IS-A lexical relationships. Conversely, iNaturalist'19 has the taxonomy of animal species [26] at its core.

tieredImageNet has been initially introduced by Ren et al. for the problem of few-shot classification, where the sets of classes between dataset splits are disjoint. The rationale of the authors was to use the WordNet hierarchy during the dataset creation to generate splits containing significantly different classes and thus better assess the generalisation capabilities of few-shot classifiers.

Despite our task and motivations being different, we decided to adopt this dataset because of the large portion of the WordNet hierarchy spanned by its classes. To make it suitable for the problem of (standard) image classification, we re-sampled the dataset maintaining the set of classes constant between the splits. Moreover, since the method proposed in Section 3.1 and YOLO-v2 [23] require that the graph representing the hierarchy is a tree, we slightly modified the DAG of the spanned WordNet hierarchy to comply with this assumption. After this procedure, we obtained a tree of height 13 and 606;702 images from 608 different classes, which we randomly assigned to training, validation and test splits with respective probabilities 0:7, 0:15 and 0:15. We refer to this modified version of tieredImageNet as tieredImageNet-H.

iNaturalist is a dataset of images of animal species that so far has mainly been used to evaluate fine-grained visual categorisation methods. The dataset construction differs significantly from the one used for ImageNet in that it has relied on passionate citizen scientists instead of mechanical turkers [29]. Importantly, for the 2019 edition of the CVPR fine grained visual recognition challenge workshop, metadata with hierarchical relationships between species have been released. Differently from WordNet, this taxonomy is a 8-level complete tree that can be readily used in our experiments without modifications. Since the labels for the test set are not public, we randomly re-sampled three splits from the total of 271;273 images from 1010 classes, again with probabilities 0:7, 0:15 and 0:15 for training, validation and test set respectively. We refer to this modified version of iNaturalist'19 as iNaturalist19-H.

For both datasets, images have been resized to 224×224.

4.2. Metrics

We consider several measures of performance, covering significantly different notions of a classifier's mistake. Top-k error. Under this metric, an example is defined as correctly classified if the ground-truth is among the k classes with the highest likelihood. It is the standard measure for classification on the basis of which methods are compared, usually with k=1 or k=5. Notice how this metric considers all mistakes of the classifier equally, no matter how "similar" is the returned class to the ground-truth.

Hierarchical measures. We also consider metrics that do weight the severity of a mistake. To measure severity, as originally proposed in the papers describing the creation of ImageNet [7, 8], we use the height of the least common ancestor (LCA) on the hierarchy between the predicted class and the ground truth. As remarked in [8], this measure should be thought of in logarithmic terms, as the number of confounded classes is exponential in the height of the ancestor. Therefore, one should not be mislead by the small absolute differences between methods when using this measure, as they cover large portions of the hierarchy. We also experimented with the Jiang-Conrath distance as suggested by Deselaers & Ferrari [10], but did not observe meaningful differences.

Using the LCA distance as a measure of severity, we report results using two further metrics.

The hierarchical distance of a mistake is the LCA between the predicted class and the ground truth when the input is misclassified, i.e. when the class with the maximum likelihood is incorrect. This metric (which we used to produce FIG. 1) measures the severity of mispredictions when only one prediction can be taken into account.

The average hierarchical distance of top-k, instead, takes the mean LCA between each one of the k classes with the highest likelihood and the ground truth. This metric is important, for example, when multiple hypothesis of a classifier are considered for a certain downstream task.

4.3. Experimental Results

In the following, we analyse the performance of the two approaches introduced in Sec. 3.1 and Sec. 3.2, which we refer to as HXE and soft-targets. Beside a vanilla crossentropy-based classifier, we also implemented and used as terms of comparison the methods proposed by Redmon & Farhadi [23] (YOLO-v2), Frome et al. [11] (DeViSE) and Barz & Denzler [4].

Implementation details. Since we are interested in understanding what allows to improve the metrics introduced above, it is essential to use a simple configuration that is common between all the algorithms taken into account. We use a ResNet-18 architecture (with weights pretrained on ImageNet) trained with Adam [22] for 200;000 steps and mini-batches of size 256. We use a learning rate of 1e-5 unless differently specified.

To prevent overfitting, we adopt PyTorch's basic data augmentation routines with default hyperparameters: RandomHorizontalFlip(and RandomResizedCropo. In the few cases where overfitting was still significant (the crossentropy, HXE and YOLO-v2 experiments on iNaturalist19-H), we also use dropout with p=0:5 on the fully-connected layer.

Figure 3:
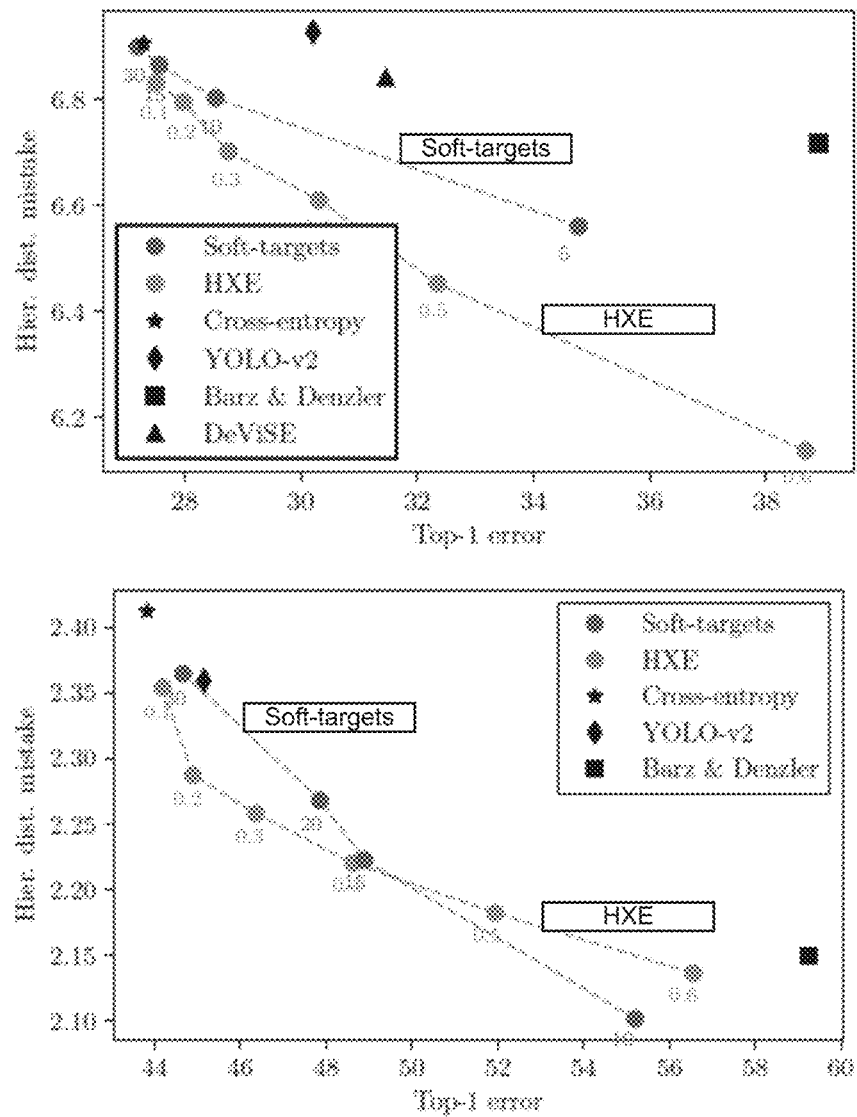
FIG. 3 shows graphs of top-1 error vs. hierarchical distance of mistakes.
Figure 4:
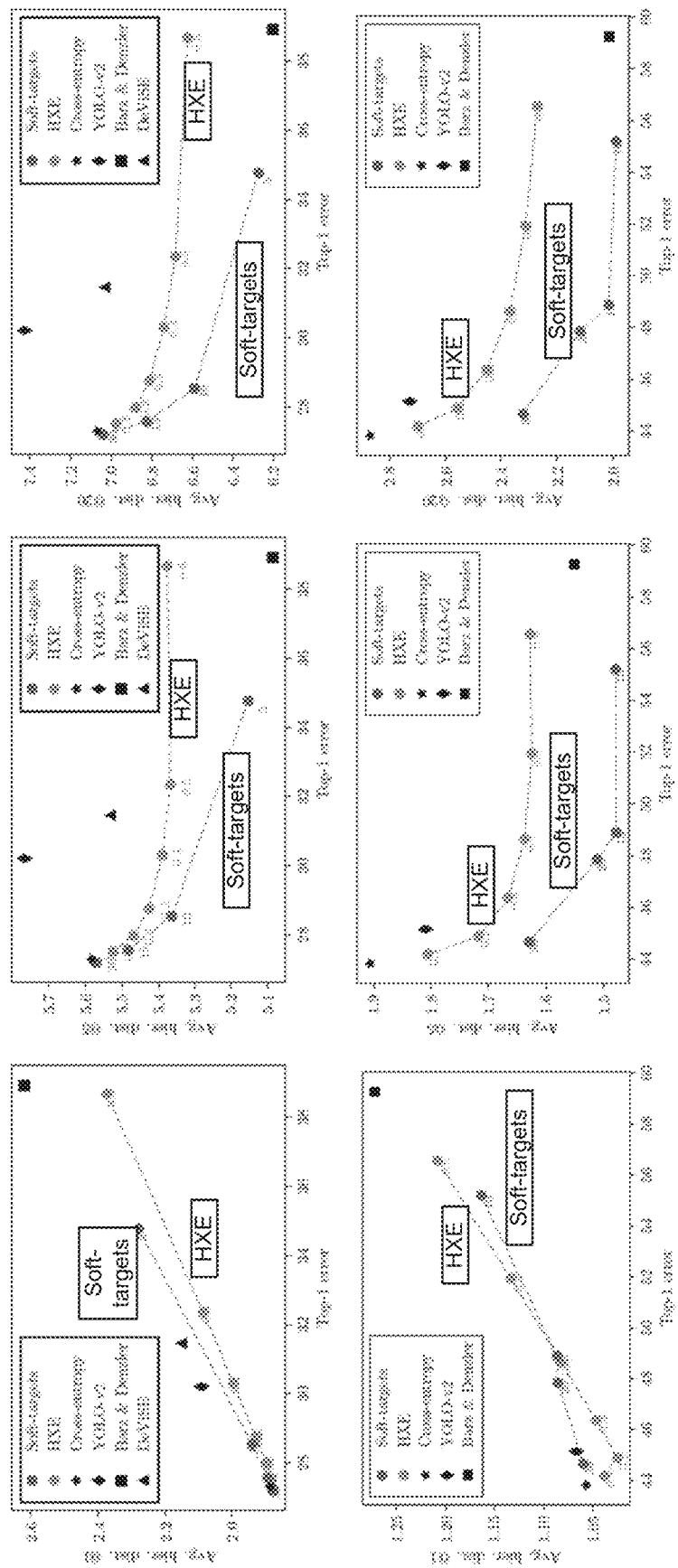
FIG. 4 shows graphs of top-1 error vs. average hierarchical distance of top-k.

Main results. In FIGS. 3 and 4, we show how it is possible to effectively trade-off top-1 error to achieve better mistakes in hierarchical sense by simply altering the hyperparameters $\alpha$ and $\beta$ from Eqn. 5 and 7. Namely, increasing a corresponds to (exponentially) discounting information down the hierarchy, thus more severely penalising mistakes where the predicted class is further away from the ground truth. Similarly, decreasing $\beta$ in the soft-targets amounts to progressively shifting the label mass away from the ground truth and towards the neighboring classes. Notice that this procedure also increases the entropy of the labels, where the two limit cases are $\beta=\infty$ for the standard one-hot case and $\beta=0$ for the uniform distribution. We experiment with $0.1 \leq \alpha \leq 0.6$ and $5 \leq \beta \leq 30$.

To reduce noise in the evaluation procedure, for both our methods and all the competitors, instead of using the epoch achieving the lowest validation loss, we fit a 4-th degree polynomial to the validation loss (after having discarded the first 50;000 training steps) and pick the epoch corresponding to its minimum, together with the four neighboring epochs. Then, to produce the points reported in our plots, we average the results obtained from these five epochs on the validation set, while reserving the test set for the experiments of FIG. 9.

FIG. 9 tabulates results on the test sets of tieredImageNet-H (top) and iNaturalist19-H (bottom), with 95% confidence intervals. For each column of each dataset, the best entry and worst entries are highlighted.

Notice how, in FIG. 4, when considering the hierarchical distance with k=1, methods are almost perfectly aligned along the plot diagonal, which demonstrates the highly linear correlation between this metric and the top-1 error.

Notice how the points on the plots belonging to our methods identify a Pareto front which completely subsume the baseline methods. For example, in FIG. 3, given any desired trade-off between top-1 error and hierarchical distance of mistakes, it is better to use HXE rather than any other method. A similar phenomenon is observable when considering the average hierarchical distance of top-5 and top-20 (FIG. 4), although in these cases it is better to use the soft-targets approach.

Using the results illustrated in FIGS. 3 and 4, we pick two reasonable operating points for both our proposals: one for the high-distance/low-top1-error and one for the low-distance/high-top1-error regime, and run them on the test set. Again, we report the mean of the results obtained from the five best epochs, this time using the standard deviation to compute 95% confidence intervals.

FIG. 3: Top-1 error vs. hierarchical distance of mistakes, for tieredImageNet-H (top) and iNaturalist19-H (bottom). Points closer to the bottom-left corner of the plot are the ones achieving the best trade-off.

FIG. 4: Top-1 error vs. average hierarchical distance of top-k, (with k∈{1, 5, 20} for tieredImageNet-H (top three) and iNaturalist19-H (bottom three). Points closer to the bottom-left corner of the plot are the ones achieving the best trade-off.

How arbitrary can the hierarchy be? Despite the Word-Net hierarchy and the Linnean taxonomy of iNaturalist are arbitrary conventions, they arguably portray meaningful visual relationships between the objects represented in the underlying datasets. Since deep neural networks leverage visual features, it is interesting to understand to which extent the specific structure of a certain hierarchy is important. In other words, what would happen with a more arbitrary hierarchy, one that does not have a direct relationship with the visual world? To answer to this question, we repeated the experiments discussed above, this time after having randomised the nodes of the hierarchy. Results on iNaturalist19-H are displayed in FIG. 5; again, we report tradeoff plots showing top-1 errors on the x-axis and metrics based on LCA hierarchical distance (on the randomised hierarchy) on the yaxis. It is evident that the hierarchical distance metrics are significantly worse for the points belonging to the random hierarchy. Despite this is not surprising, the extent to which the results deteriorate is remarkable, suggesting that the inherent nature of the structural relationship expressed by a hierarchy is paramount for learning classifiers that, besides achieving competitive top-1 accuracy, are also able to commit better mistakes.

Figure 5:
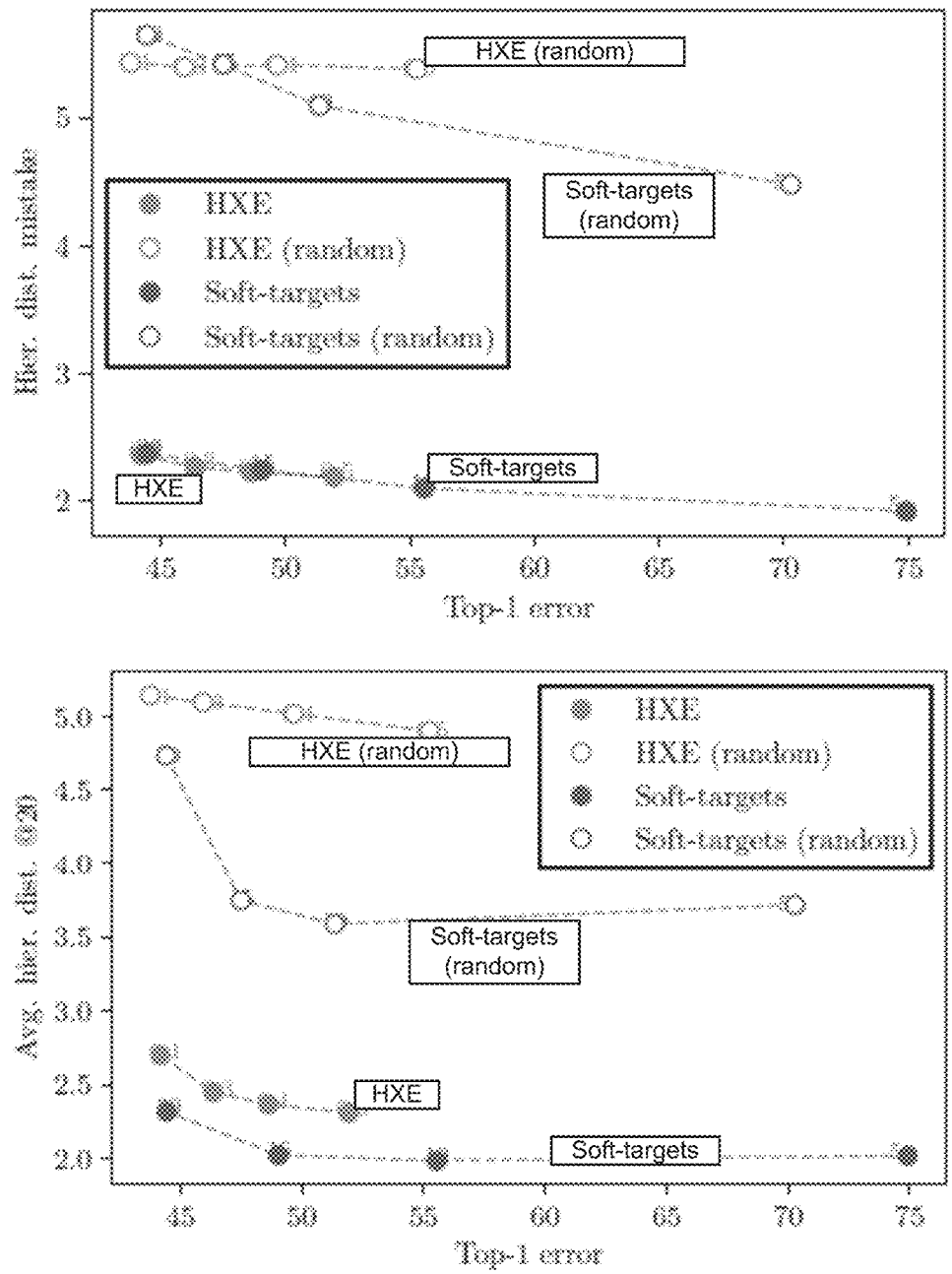
FIG. 5 shows graphs of top-1 error vs. hierarchical distance of mistakes (top) and hierarchical distance of top-20 (bottom)

FIG. 5: Top-1 error vs. hierarchical distance of mistakes (top) and hierarchical distance of top-20 (bottom) for iNaturalist19-H.

For the soft-targets, the top-1 error of the random hierarchy is consistently lower than its "real" hierarchy counterpart. The phenomen exacerbates when increasing the entropy of the target label; this might be due to the structural constraints imposed by a hierarchy anchored to the visual world, which can limit a neural network from learning spurious correlation that allows to achieves low error in the one-hot sense.

REFERENCES

Each of the following is incorporated herein by reference in its entirety:

[4] Bjrn Barz and Joachim Denzler. Hierarchy-based Image Embeddings for Semantic Image Retrieval. 2019 IEEE Winter Conference on Applications of Computer Vision (WACV), pages 638-647, January 2019. doi: 10.1109/WACV.2019.00073. URL http://arxiv.org/abs/1809.09924. arXiv: 1809.09924.

[6] Yin Cui, Menglin Jia, Tsung-Yi Lin, Yang Song, and Serge Belongie. Class-balanced loss based on effective number of samples. In Proceedings of the IEEE Conference on Computer Vision and Pattern Recognition, pages 9268-9277, 2019.

[7] Jia Deng, Wei Dong, Richard Socher, Li-Jia Li, Kai Li, and Li Fei-Fei. ImageNet: A large-scale hierarchical image database. In 2009 IEEE Conference on Computer Vision and Pattern Recognition, pages 248-255, June 2009. doi: 10.1109/CVPR.2009.5206848. ISSN: 1063-6919.

[8] Jia Deng, Alexander C. Berg, Kai Li, and Li Fei-Fei. What Does Classifying More Than 10,000 Image Categories Tell Us? In Computer Vision ECCV 2010, volume 6315, pages 71-84. Springer Berlin Heidelberg, Berlin, Heidelberg, 2010. ISBN 978-3-642-15554-3 978-3-642-15555-0. doi: 10.1007/978-3-642-15555-06. URL http://link.springer.com/10.1007/978-3-642-15555-0_6.

[10] Thomas Deselaers and Vittorio Ferrari. Visual and semantic similarity in ImageNet. In CVPR 2011, pages 1777-1784, Colorado Springs, CO, USA, June 2011. IEEE. ISBN 978-1-4577-0394-2. doi: 10.1109/CVPR.2011.5995474. URL http://ieeexplore.ieee.org/document/5995474/.

[11] Andrea Frome, Greg S Corrado, Jon Shlens, Samy Bengio, Jeff Dean, Marcntextquotesingle Aurelio Ranzato, and Tomas Mikolov. DeViSE: A Deep Visual Semantic Embedding Model. In C. J. C. Burges, L. Bottou, M. Welling, Z. Ghahramani, and K. Q. Weinberger, editors, Advances in Neural Information Processing Systems 26, pages 2121-2129. Curran Associates, Inc., 2013. URL http://papers.nips.cc/paper/5204-devise-a-deep-visual-semantic-embedding-model.

[16] Tsung-Yi Lin, Priya Goyal, Ross B. Girshick, Kaiming He, and Piotr Doll'ar. Focal loss for dense object detection. CoRR, abs/1708.02002, 2017. URL http://arxiv.org/abs/1708.02002.

[19] George A Miller. WordNet: An electronic lexical database. 1998.

[22] Sashank J Reddi, Satyen Kale, and Sanjiv Kumar. On the convergence of adam and beyond. In International Conference on Learning Representations, 2019.

[23] Joseph Redmon and Ali Farhadi. YOLO9000: Better, Faster, Stronger. In 2017 IEEE Conference on Computer Vision and Pattern Recognition (CVPR), pages 6517-6525, Honolulu, HI, July 2017. IEEE. ISBN 978-1-5386-0457-1. doi: 10.1109/CVPR.2017.690. URL http://ieeexplore.ieee.org/document/8100173/.

[24] Mengye Ren, Eleni Triantafillou, Sachin Ravi, Jake Snell, Kevin Swersky, Joshua B Tenenbaum, Hugo Larochelle, and Richard S Zemel. Meta-learning for semi-supervised fewshot classification. In International Conference on Learning Representations, 2018.

[26] Michael A Ruggiero, Dennis P Gordon, Thomas M Orrell, Nicolas Bailly, Thierry Bourgoin, Richard C Brusca, Thomas Cavalier-Smith, Michael D Guiry, and Paul M Kirk. A higher level classification of all living organisms. PloS one, 2015.
[27] Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. International Journal of Computer Vision, 2015.
[29] Grant Van Horn, Oisin Mac Aodha, Yang Song, Yin Cui, Chen Sun, Alex Shepard, Hartwig Adam, Pietro Perona, and Serge Belongie. The inaturalist species classification and detection dataset. In IEEE Conference on Computer Vision and Pattern Recognition.

The invention claimed is:

1. A computer-implemented method of training a perception model to classify inputs in relation to a discrete set of leaf node classes, the method comprising:
in a structured training process, adapting parameters of the perception model to optimize an empirical risk with respect to a set of training inputs, each training input assigned to a ground truth leaf node class of the discrete set of leaf node classes, the empirical risk defined as a combination of individual losses,
wherein for each training input, the perception model outputs a classification score for each leaf node class of the discrete set of leaf node classes,
wherein each individual loss is defined as a loss function applied to one of the training inputs and its ground truth leaf node class,
wherein the loss function is defined with respect to a hierarchical classification tree encoding hierarchical relationships between the discrete set of leaf node classes,
wherein the loss function is dependent on the classification score for that training input and its ground truth leaf node class but also the classification scores for at least some others leaf node classes of the discrete set of leaf node classes, wherein the classification scores of the other leaf node classes are weighted in dependence on their hierarchical relationship to the ground truth leaf node class within the hierarchical classification tree.

2. The method of claim 1, wherein the classification scores of the other leaf node classes are weighted by determining a path through the hierarchical classification tree from the ground truth leaf node class to a root node of the tree, wherein the loss function comprises a weighted conditional probability term for each node on the path determined as an aggregation of the classification scores for all of the leaf node classes that are descendants of the that path node, in proportion to an aggregation of the classification scores for all of the leaf node classes that are descendants of the node that is an immediate parent of that path node.

3. The method of claim 2, wherein the conditional probability term for each path node is weighted in dependence on a height of a subtree defined by that path node.

4. The method of claim 1, wherein the classification score for each of the other leaf node classes is weighted in a way that is explicitly or implicitly dependent on a hierarchical distance between that other leaf node class and the ground truth leaf node class, the hierarchical distance being a height of a subtree defined by a lowest common ancestor node of that other leaf node class and the ground truth class, the lowest common ancestor node being a lowest-level node of which both the ground truth leaf node class and that other leaf node class are descendants in the hierarchical classification tree.

5. The method of claim 1, wherein the loss function comprises a term for each leaf node class, which is dependent only on the classification score for that leaf node class, and a weighting factor is applied to that term which is dependent on a hierarchical distance between that leaf node class and the ground truth leaf node class, the hierarchical distance being a height of a subtree defined by a lowest common ancestor node of that other leaf node class and the ground truth class, the lowest common ancestor node being a lowest-level node of which both the ground truth leaf node class and that other leaf node class are descendants in the hierarchical classification tree.

6. The method of claim 1, wherein the perception model has a neural network architecture.

7. The method of claim 6, wherein the perception model has a convolutional neural network architecture.

8. The method of claim 1, wherein each training input comprises sensor data.

9. The method of claim 8, wherein each training input comprises image data, the leaf node classes being image classes.

10. Executable program instructions embodied on non-transitory media and configured, when executed, to train a perception model to classify inputs in relation to a discrete set of leaf node classes, by implementing operations comprising:
in a structured training process, adapting parameters of the perception model to optimize an empirical risk with respect to a set of training inputs, each training input assigned to a ground truth leaf node class of the discrete set of leaf node classes, the empirical risk defined as a combination of individual losses,
wherein for each training input, the perception model outputs a classification score for each leaf node class of the discrete set of leaf node classes,
wherein each individual loss is defined as a loss function applied to one of the training inputs and its ground truth leaf node class,
wherein the loss function is defined with respect to a hierarchical classification tree encoding hierarchical relationships between the discrete set of leaf node classes,
wherein the loss function is dependent on the classification score for that training input and its ground truth leaf node class but also the classification scores for at least some others leaf node classes of the discrete set of leaf node classes, wherein the classification scores of the other leaf node classes are weighted in dependence on their hierarchical relationship to the ground truth leaf node class within the hierarchical classification tree.

11. The executable program instructions of claim 10, configured to weight the classification scores of the other leaf node classes by determining a path through the hierarchical classification tree from the ground truth leaf node class to a root node of the tree, wherein the loss function comprises a weighted conditional probability term for each node on the path determined as an aggregation of the classification scores for all of the leaf node classes that are descendants of the that path node, in proportion to an aggregation of the classification scores for all of the leaf node classes that are descendants of the node that is an immediate parent of that path node.

12. The executable program instructions of claim 11, wherein the conditional probability term for each path node is weighted in dependence on a height of a subtree defined by that path node.

13. The executable program instructions of claim 10, configured to weight the classification score for each of the other leaf node classes in a way that is explicitly or implicitly dependent on a hierarchical distance between that other leaf node class and the ground truth leaf node class, the hierarchical distance being a height of a subtree defined by a lowest common ancestor node of that other leaf node class and the ground truth class, the lowest common ancestor node being a lowest-level node of which both the ground truth leaf node class and that other leaf node class are descendants in the hierarchical classification tree.

14. The executable program instructions of claim 10, wherein the loss function comprises a term for each leaf node class, which is dependent only on the classification score for that leaf node class, and a weighting factor is applied to that term which is dependent on a hierarchical distance between that leaf node class and the ground truth leaf node class, the hierarchical distance being a height of a subtree defined by a lowest common ancestor node of that other leaf node class and the ground truth class, the lowest common ancestor node being a lowest-level node of which both the ground truth leaf node class and that other leaf node class are descendants in the hierarchical classification tree.

15. The executable program instructions of claim 10, wherein the perception model has a convolutional neural network architecture, and wherein each training input comprises image data, the leaf node classes being image classes.

16. A computer system comprising:
one or more hardware processors configured to implement a trained perception model, the trained perception model configured to receive a perception input, and classify the perception input in relation to a discrete set of leaf node classes, the perception model having been trained in a structured training process, by adapting parameters of the perception model to optimize an empirical risk with respect to a set of training inputs, each training input assigned to a ground truth leaf node class of the discrete set of leaf node classes, the empirical risk defined as a combination of individual losses,
wherein for each training input, the perception model outputs a classification score for each leaf node class of the discrete set of leaf node classes,
wherein each individual loss is defined as a loss function applied to one of the training inputs and its ground truth leaf node class,
wherein the loss function is defined with respect to a hierarchical classification tree encoding hierarchical relationships between the discrete set of leaf node classes,
wherein the loss function is dependent on the classification score for that training input and its ground truth leaf node class but also the classification scores for at least some others leaf node classes of the discrete set of leaf node classes, wherein the classification scores of the other leaf node classes are weighted in dependence on their hierarchical relationship to the ground truth leaf node class within the hierarchical classification tree.

17. The computer system of claim 16, wherein the classification scores of the other leaf node classes are weighted by determining a path through the hierarchical classification tree from the ground truth leaf node class to a root node of the tree, wherein the loss function comprises a weighted conditional probability term for each node on the path determined as an aggregation of the classification scores for all of the leaf node classes that are descendants of the that path node, in proportion to an aggregation of the classification scores for all of the leaf node classes that are descendants of the node that is an immediate parent of that path node.

18. The computer system of claim 17, wherein the conditional probability term for each path node is weighted in dependence on a height of a subtree defined by that path node.

19. The computer system of claim 16, wherein the classification score for each of the other leaf node classes is weighted in a way that is explicitly or implicitly dependent on a hierarchical distance between that other leaf node class and the ground truth leaf node class, the hierarchical distance being a height of a subtree defined by a lowest common ancestor node of that other leaf node class and the ground truth class, the lowest common ancestor node being a lowest-level node of which both the ground truth leaf node class and that other leaf node class are descendants in the hierarchical classification tree.

20. The computer system of claim 16, wherein the loss function comprises a term for each leaf node class, which is dependent only on the classification score for that leaf node class, and a weighting factor is applied to that term which is dependent on a hierarchical distance between that leaf node class and the ground truth leaf node class, the hierarchical distance being a height of a subtree defined by a lowest common ancestor node of that other leaf node class and the ground truth class, the lowest common ancestor node being a lowest-level node of which both the ground truth leaf node class and that other leaf node class are descendants in the hierarchical classification tree.

* * * * *